(12) United States Patent
Kaulgud et al.

(10) Patent No.: US 9,785,535 B2
(45) Date of Patent: Oct. 10, 2017

(54) MULTI-DATA ANALYSIS BASED PROACTIVE DEFECT DETECTION AND RESOLUTION

(71) Applicant: ACCENTURE GLOBAL SERVICES LIMITED, Dublin (IE)

(72) Inventors: Vikrant Shyamkant Kaulgud, Pune (IN); Amitabh Saxena, Bangalore (IN); Kapil Singi, Bangalore (IN); Vibhu Saujanya Sharma, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 122 days.

(21) Appl. No.: 14/961,328

(22) Filed: Dec. 7, 2015

(65) Prior Publication Data
US 2017/0046246 A1 Feb. 16, 2017

(30) Foreign Application Priority Data
Aug. 10, 2015 (IN) .......................... 4153/CHE/2015

(51) Int. Cl.
G06F 9/44 (2006.01)
G06F 11/36 (2006.01)
G06Q 30/02 (2012.01)

(52) U.S. Cl.
CPC ............ *G06F 11/3612* (2013.01); *G06F 8/30* (2013.01); *G06Q 30/0282* (2013.01)

(58) Field of Classification Search
None
See application file for complete search history.

(56) References Cited

U.S. PATENT DOCUMENTS

| 7,788,536 B1 * | 8/2010 | Qureshi | G06N 5/048 714/26 |
| 8,363,942 B1 * | 1/2013 | Silver | G06K 9/481 382/141 |

(Continued)

FOREIGN PATENT DOCUMENTS

WO 2011146750 11/2011

OTHER PUBLICATIONS

Fu, B. et al., 'Why people hate your app: making sense of user feedback in a mobile app store', KDD'13 The 19th ACM SIGKDD international conference on Knowledge discovery and data mining, New York: ACM, 2013, Aug. 11-14, pp. 1276-1284.

(Continued)

*Primary Examiner* — Evral E Bodden
(74) *Attorney, Agent, or Firm* — Mannava & Kang, P.C.

(57) ABSTRACT

Multi-data analysis based proactive defect detection and resolution may include analyzing operational data for an application to determine whether a functionality related to the application is below a predetermined threshold associated with the functionality related to the application, and based on the analysis, generating an indication to perform defect analysis related to the functionality related to the application. A sentiment analysis may be performed on consumer data related to the application to determine a sentiment of the consumer data related to the application, and a natural language processing (NLP) analysis may be performed on the consumer data related to the application to determine a function associated with a negative sentiment. Application code and process data related to the application may be analyzed to determine a defect associated with the application. Further, a code of the application may be modified to correct the defect associated with the application.

20 Claims, 22 Drawing Sheets

(56) References Cited

U.S. PATENT DOCUMENTS

| | | | | |
|---|---|---|---|---|
| 8,363,972 | B1* | 1/2013 | Silver | G06K 9/481 |
| | | | | 382/181 |
| 8,682,097 | B2* | 3/2014 | Steinberg | G06T 5/50 |
| | | | | 382/275 |
| 9,229,800 | B2* | 1/2016 | Jain | G06Q 30/01 |
| 2008/0162688 | A1 | 7/2008 | Reumann et al. | |
| 2011/0314438 | A1 | 12/2011 | Surazski et al. | |
| 2017/0046246 | A1* | 2/2017 | Kaulgud | G06F 11/3612 |

OTHER PUBLICATIONS

Dynatrace User Experience Management [retrieved from internet on Oct. 25, 2016], published on Jun. 15, 2015 as per Wayback Machine. 14 pages. <URL: http://web.archive.org/web/20150615145106/http://dynatrace.com/en/products/user-experience-management.html>.

Gauchet, S., Learn How People Use Your App—An App Analytics Tools Roundup, [retrieved from internet on Oct. 25, 2016], 16 pages. <URL: http://web.archive.org/web/20141022055936/http://www.apptamin.com/blog/app-analytics-tools/> published on Oct. 22, 2014 as Wayback Machine.

Maria Gomez et al., "When app stores listen to the crowd to fight bugs in the wild", Software Engineering, IEEE Press, 445 Hoes Lane, PO Box 1331, Piscataway, NJ 08855, UDS, May 16, 2015, 4 pages.

Guzman Emitza et al: "How Do Users Like This Feature A Fine Grained Sentiment Analysis of App Reviews", 2014 IEEE 22nd International Requirements Engineering Conference (RE), IEEE, Aug. 25, 2014, pp. 153-162.

Shital S. Dabhade et al: "An Application for Sentiment Analysis Based on Expressive Feature in the Sentence", International Journal of Advance Research in Computer Science and Management Studies, May 1, 2015, 7 pages.

Claudia Iacob et al: "Online Reviews as First Class Artifacts in Mobile App Development", In: "Lecture Notes of the Institute for Computer Sciences, Social Informatics and Telecommunications Engineering", Jan. 1, 2014, Springer, DE, vol. 130, pp. 47-53.

* cited by examiner

Application Metric Data

| | A | B | C | D | E | F | G |
|---|---|---|---|---|---|---|---|
| | Version no | Week # | Average Rating | Change in rating | No. of downloads | No. of updates | No. of transactions |
| 1 | 2.1 | 2 | 3.9 | -0.3 | 3000 | 4000 | 500 |
| 2 | 2.1 | 1 | 4.2 | -0.1 | 4000 | 8000 | 300 |
| 3 | 2.0.1 | 6 | 4.3 | 0 | 10000 | 15000 | 20000 |
| 4 | 2.0.1 | 5 | 4.3 | 0.1 | 9500 | 18000 | 16300 |
| 5 | 2.0.1 | 4 | 4.2 | 0.1 | 9300 | 13000 | 14000 |
| 6 | 2.0.1 | 3 | 4.1 | 0 | 12000 | 17000 | 15500 |
| 7 | 2.0.1 | 2 | 4.1 | 0.1 | 10200 | 12000 | 14300 |
| 8 | 2.0.1 | 1 | 0 | 0 | 15000 | 18000 | 22000 |
| 9 | 1.2 | 8 | 0 | 0 | 12000 | 14300 | 15400 |
| 10 | 1.2 | 7 | -0.1 | -0.1 | 11000 | 12000 | 14000 |

Release Transition Data

| | A | B | C | D | E |
|---|---|---|---|---|---|
| 1 | | No Of Updates | No of downloads | Total Users | Users in previous versions |
| 2 | 2.1 | 2000 | 1600 | 42100 | 38500 |
| 3 | 2.0.1 | 18000 | 20000 | 40500 | 2500 |
| 4 | 1.2 | 10000 | 10000 | 20500 | 500 |
| 5 | 1.1 | 5000 | 5500 | 10500 | 0 |
| 6 | 1 | 0 | 5000 | 5000 | 0 |

Release Change Data

| | A | B | C | D |
|---|---|---|---|---|
| | Version No | Release Date | Major Changes | Detail of Changes |
| 2 | 2.1 | 01/02/15 | UI, Bug fixes | Login screen and associated functionality changed. Previous bug fixed. |
| 3 | 2.0.1 | 01/12/14 | DB Connectivity | Change in backend connectivity functionality. New functionality for authentication |
| 4 | 1.2 | 01/09/14 | Bug fixes | Fixed connectivity issue and crashing problem. |

FIG. 7

Release Metric Data

| | A | B | C | D | E | F | G |
|---|---|---|---|---|---|---|---|
| 1 | Version No. | Release Date | Weeks in market | Total No. of Users | Active Users | Avg. Downloads | Avg. updates |
| 2 | 2.1 | 01/02/15 | 2 | 42100 | 38000 | 800 | 1000 |
| 3 | 2.0.1 | 01/07/14 | 6 | 40500 | 39000 | 3333 | 3000 |
| 4 | 1.2 | 01/05/14 | 8 | 20500 | 20200 | 1250 | 1250 |
| 5 | 1.1 | 01/03/14 | 8 | 10500 | 10000 | 687.5 | 625 |
| 6 | 1 | 01/02/14 | 4 | 5000 | 4800 | 1250 | 0 |

FIG. 8 bugTicket1 - Notepad

File  Edit  Format  View  Help

```xml
<?xml version="1.0" encoding="UTF-8" standalone="no"?>
<Result>
  <Version NO="2.1">
    <AverageNoOfDownloads>29058.405923344944</AverageNoOfDownloads>
    <ChangeInAverageDownloads>2533.0</ChangeInAverDownloads>
    <AverageNoOfUpdates>26658.101045296167</AverageNoOfUpdates>
    <ChangeInAverageUpdates>2000.0</ChangeInAverageUpdates>
    <UsersInPreviousVersions>36000</UsersInPreviousVersions>
    <InactiveUsers>4100</InactiverUsers>
    <ChangeInRating>-3</ChangeInRating>
    <DangerLevel>8</DangerLevel>
    <Changes>Current Version : UI. Bug fixes.  Previous version  :DB Connectivity. Authentication</Changes>
    <ChangeDetails>Current Version : Login screen and associated functionality changed.
      Previous bugs fixed..
      Previous version : Change in backend connectivity functionality.
      New functionality for authentication</ChangeDetails>
  </version>
</Result>
```

1200 → `<Version NO="2.1">`
1202 → `<UsersInPreviousVersions>`
1204 → `<ChangeInRating>`
1206 → `<ChangeDetails>`

FIG. 12

1300 → SENTECNE – After installing updates not able to login to account.
Continue option is working but after putting the password it is not going through and it is telling you {
  "positive": [],
  "negative": [
    {
      "sentiment": "notable",
      "topic": null,
      "score": -0.28472366128412085,
      "original_text": "not able",
      "original_length": 8,
      "normalized_text": "not able",
      "normalized_length": 8
    }
  ],
  "aggregate": {
    "sentiment": "negative",
    "score": -0.28472366128412085
  }
}

1400 → "sentiment": "notable",
1404 → "normalized_text": "not able",
1402 → "aggregate": {

FIG. 14

1302 → Sentence – Not working...after the update

{
  "positive": [],
  "negative": [
    {
      "sentiment": null,
      "topic": null,
      "score": -0.3377088371714044,
      "original_text": "Not working...",
      "original_length": 14,
      "normalized_text": "not working...",
      "normalized_length": 14
    }
  ],
  "aggregate": {
    "sentiment": "negative",
    "score": -0.3377088371714044
  }
}

1500
1504 → "normalized_text": "not working...",
1502 → "aggregate": {

FIG. 15

USER SAMPLE LOG DATA IN JSON FORMAT

1700 → USER SAMPLE LOG DATA 1000,1:01:00 am,96886,Login
1000,1:04:01 am,96886,Menu
1000,1:02:02 am,96886,Logout 1000,12:01:00 am,58862,Login 1000,1:01:00 am,98889,Login
1000,1:04:01 am,98889,Menu
1000,1:02:02 am,98889,Logout 1000,11:01:00 am,98861,Login
1000,11:04:01 am,98861,Menu
1000,11:02:02 am,98861,Logout 1000,12:01:00 am,98862,Login
1000,12:04:01 am,98862,Menu
1000,12:02:02 am,98862,Logout 1702 → 1001,11:00:00 am,96001,Login
1001,11:02:02 am,96001,Menu
1001,11:05:05 am,96001,Logout 1002,11:05:03 am,78901,Login
1002,11:10:09 am,78901,Menu
1002,11:11:15 am,78901,Logout 1003,10:00:30 am,22222,Login
1003,10:01:35 am,22222,Menu
1003,10:07:57 am,22222,Logout 1004,12:40:29 pm,67839,Login
1004,12:41:29 pm,67839,Menu
1004,12:50:30 pm,67839,Logout 1005,12:43:00 pm,67868,Login
1005,12:44:02 pm,67868,Menu
1005,12:55:05 pm,67868,Logout 1006,9:40:12 pm,57839,Login
1006,9:41:00 pm,57839,Menu
1006,9:50:26 pm,57839,Logout 1007,8:40:11 pm,67879,Login
1007,6:41:23 pm,67879,Menu
1007,8:50:34 pm,67879,Logout

[{"UserId":"1000","Time":"1:01:00 am","SessionId":"98888","UserElementType":"Login"},{"UserId":"1000","Time":"1:04:01 am","SessionId":"98888","UserElementType":"Menu"},{"UserId":"1000","Time":"1:02:02 am","SessionId":"98888","UserElementType":"Logout"},
{"UserId":"1000","Time":"12:01:00 am","SessionId":"58832","UserElementType":"Login"},{"UserId":"1000","Time":"1:01:00 am","SessionId":"98889","UserElementType":"Menu"},
{"UserId":"1000","Time":"1:02:02 am","SessionId":"98889","UserElementType":"Login"},{"UserId":"1000","Time":"11:04:01 am","SessionId":"98881","UserElementType":"Logout"},{"UserId":"1000","Time":"12:01:00 am","SessionId":"98881","UserElementType":"Menu"},
{"UserId":"1000","Time":"11:02:02 am","SessionId":"98831","UserElementType":"Logout"},{"UserId":"1000","Time":"12:04:01 am","SessionId":"98882","UserElementType":"Login"},{"UserId":"1000","Time":"12:04:01 am","SessionId":"98882","UserElementType":"Menu"},
{"UserId":"1000","Time":"12:02:02 am","SessionId":"98882","UserElementType":"Logout"},{"UserId":"1001","Time":"11:00:00 am","SessionId":"96001","UserElementType":"Login"},{"UserId":"1001","Time":"11:02:02","SessionId":"96001","UserElementType":"Menu"},
{"UserId":"1001","Time":"11:05:05 am","SessionId":"96001","UserElementType":"Logout"},{"UserId":"1002","Time":"11:10:09","SessionId":"78901","UserElementType":"Login"},
{"UserId":"1002","Time":"11:11:15 am","SessionId":"78901","UserElementType":"Logout"},{"UserId":"1003","Time":"10:00:30","SessionId":"22222","UserElementType":"Login"},
{"UserId":"1002","Time":"10:07:57 am","SessionId":"22222","UserElementType":"Menu"},{"UserId":"1003","Time":"12:41:29","SessionId":"22222","UserElementType":"Logout"},
{"UserId":"1004","Time":"12:50:30 pm","SessionId":"67839","UserElementType":"Login"},{"UserId":"1004","Time":"12:43:00","SessionId":"67839","UserElementType":"Menu"},
{"UserId":"1004","Time":"12:44:02","SessionId":"67839","UserElementType":"Logout"},{"UserId":"1005","Time":"12:44:02","SessionId":"67868","UserElementType":"Menu"},
{"UserId":"1005","Time":"12:55:05 pm","SessionId":"67868","UserElementType":"Logout"},{"UserId":"1006","Time":"9:40:12","SessionId":"57839","UserElementType":"Login"},
{"UserId":"1006","Time":"9:50:26 pm","SessionId":"57839","UserElementType":"Menu"},{"UserId":"1006","Time":"8:41:23","SessionId":"57839","UserElementType":"Logout"},
{"UserId":"1007","Time":"8:50:34 pm","SessionId":"67879","UserElementType":"Login"},{"UserId":"1007","Time":"8:40:23","SessionId":"67879","UserElementType":"Menu"},
{"UserId":"1007","Time":"8:41:34","SessionId":"67879","UserElementType":"Logout"},{"UserId":"1008","Time":"8:42:50 pm","SessionId":"67279","UserElementType":"BalanceEnquiry"},{"UserId":"1008","Time":"8:53:59","SessionId":"67279","UserElementType":"Logout"},{"UserId":"1009","Time":"8:40:32","SessionId":"67279","UserElementType":"Menu"},
{"UserId":"1009","Time":"8:41:33 pm","SessionId":"67779","UserElementType":"Menu"},{"UserId":"1009","Time":"8:42:34","SessionId":"67779","UserElementType":"BalanceEnquiry"},{"UserId":"1009","Time":"8:53:45","SessionId":"67779","UserElementType":"Logout"}]

FIG. 17

```
> db.NavigationData.find<>.pretty<>
{
    "_id" : ObjectId("55308f4fa7bdf34443f7aa437"),
    "UserId" : "1000",
    "Time" : "1:01:00' am",
    "SessionId" : "98888",
    "UserElemenetType" : "Login"
}
{
    "_id" : ObjectId(55308f4fa7bdf34443f7aa438"),
    "UserId" : "1000",
    "Time" : "1:04:01' am",
    "SessionId" : "98888",
    "UserElemenetType" : "Menu"
}
{
    "_id" : ObjectId(55308f4fa7bdf34443f7aa439"),
    "UserId" : "1000",
    "Time" : "1:02:02' am",
    "SessionId" : "98888",
    "UserElemenetType" : "Logout"
}
{
    "_id" : ObjectId(55308f4fa7bdf34443f7aa43a"),
    "UserId" : "1000",
    "Time" : "12:01:00' am",
    "SessionId" : "98888",
    "UserElemenetType" : "Login"
}
{
    "_id" : ObjectId(55308f4fa7bdf34443f7aa43b"),
    "UserId" : "1000",
    "Time" : "1:01:00' am",
    "SessionId" : "98888",
    "UserElemenetType" : "Login"
}
{
    "_id" : ObjectId("55308f4fa7bdf34443f7aa43c"),
    "UserId" : "1000",
    "Time" : "1:04:01' am",
    "SessionId" : "98889",
    "UserElemenetType" : "Menu"
}
{
    "_id" : ObjectId(55308f4fa7bdf34443f7aa43d"),
    "UserId" : "1000",
    "Time" : "1:02:01' am",
    "SessionId" : "98889",
    "UserElemenetType" : "BalanceEnquiry"
}
{
    "_id" : ObjectId(55308f4fa7bdf34443f7aa43e"),
    "UserId" : "1000",
    "Time" : "1:02:02' am",
    "SessionId" : "98889",
    "UserElemenetType" : "Logout"
}
{
    "_id" : ObjectId(55308f4fa7bdf34443f7aa43f"),
    "UserId" : "1000",
    "Time" : "11:01:00' am",
    "SessionId" : "98881",
    "UserElemenetType" : "Login"
}
{
    "_id" : ObjectId(55308f4fa7bdf34443f7aa440"),
    "UserId" : "1000",
    "Time" : "11:04:01' am",
    "SessionId" : "98881",
    "UserElemenetType" : "Menu"
}
{
    "_id" : ObjectId(55308f4fa7bdf34443f7aa441"),
    "UserId" : "1000",
    "Time" : "11:02:02' am",
    "SessionId" : "98881",
    "UserElemenetType" : "Logout"
}
```

FIG. 18

USER_SESSION_DATA

```
C:\Windows\system32\cmd.exe - mongo
>db.User_SessionDetails.find().pretty()
{
  "_id" : ObjectId("55308f50a7bdf344317aa576"),
  "UserId" : "1022",
  "SessionId" : [
    "21115",
    "11115"
  ]
},
{
  "_id" : ObjectId("55308f50a7bdf344317aa577"),
  "UserId" : "1021",
  "SessionId" : [
    "11114"
  ]
},
{
  "_id" : ObjectId("55308f50a7bdf344317aa578"),
  "UserId" : "1020",
  "SessionId" : [
    "21113",
    "11113"
  ]
},
{
  "_id" : ObjectId("55308f50a7bdf344317aa579"),
  "UserId" : "1019",
  "SessionId" : [
    "11112"
  ]
},
{
  "_id" : ObjectId("55308f50a7bdf344317aa57a"),
  "UserId" : "1018",
  "SessionId" : [
    "11111"
  ]
},
{
  "_id" : ObjectId("55308f50a7bdf344317aa57b"),
  "UserId" : "1017",
  "SessionId" : [
    "12399"
  ]
},
```

FIG. 19A

GRAPH DETAILS (FOR EACH SESSION)

```
{
  "_id" : ObjectId("55308f50a7bdf344317aa5c2"),
  "UserId" : "1033",
  "SessionId" : "31126",
  "UserElementType" : [
    "Login",
    "Menu",
    "DepositAccount",
    "Logout"
  ],
  "Edges" : [
    "Edge0",
    "Edge1",
    "Edge2",
    "Edge3"
  ],
  "PathData" : [
    {
      "Edge0" : [
        "Login",
        "Menu"
      ]
    },
    {
      "Edge1" : [
        "Menu",
        "DepositAccount"
      ]
    },
    {
      "Edge2" : [
        "DepositAccount",
        "Logout"
      ]
    },
    {
      "Edge3" : [
        "Logout",
        "Login"
      ]
    }
  ]
}
```

FIG. 19B

```
<?xml version="1.0" encoding="UTF-8"?>
<BugTicket>
 - <Version No="2.1">
     <ReleaseDate>01/02/2015</ReleaseDate>
     <DevelopmentTeam>Dev123</DevelopmentTeam>
     <TestingTeam>Test123</TestingTeam>
     <CorporateTeam>BI123</CorporateTeam>
   </Version>
</BugTicket>
```

2400

2600

PERFORM A SENTIMENT ANALYSIS ON CONSUMER DATA RELATED TO AN APPLICATION TO DETERMINE A SENTIMENT OF THE CONSUMER DATA RELATED TO THE APPLICATION, AND A LANGUAGE PROCESSING ANALYSIS, IN RESPONSE TO A DETERMINATION THAT THE SENTIMENT IS A NEGATIVE SENTIMENT, ON THE CONSUMER DATA RELATED TO THE APPLICATION TO DETERMINE A FUNCTION ASSOCIATED WITH THE NEGATIVE SENTIMENT
2602

ANALYZE, IN RESPONSE TO THE DETERMINATION THAT THE SENTIMENT IS THE NEGATIVE SENTIMENT, APPLICATION CODE AND PROCESS DATA RELATED TO THE APPLICATION TO DETERMINE A DEFECT ASSOCIATED WITH THE APPLICATION
2604

MODIFY A CODE OF THE APPLICATION TO CORRECT THE DEFECT ASSOCIATED WITH THE APPLICATION
2606

FIG. 26

MULTI-DATA ANALYSIS BASED PROACTIVE DEFECT DETECTION AND RESOLUTION

PRIORITY

The present application claims priority to Indian patent application number 4153/CHE/2015, having a filing date of Aug. 10, 2015, the disclosures of which are hereby incorporated by reference in its entirety.

BACKGROUND

Applications, such as digital applications, may include any type of computer application that is designed to perform a task. For example, an automobile model generation application may be designed to generate a model of an automobile based on a user configuration of the automobile. Such applications may include defects that impact the intended functionality thereof.

BRIEF DESCRIPTION OF DRAWINGS

Features of the present disclosure are illustrated by way of examples shown in the following figures. In the following figures, like numerals indicate like elements, in which:

FIG. 5 illustrates application metric data for an application, according to an example of the present disclosure;

FIG. 6 illustrates release transition data, according to an example of the present disclosure;

FIG. 7 illustrates release change data for an application, according to an example of the present disclosure;

FIG. 8 illustrates release metric data, according to an example of the present disclosure;

FIG. 12 illustrates an Extensible Markup Language (XML) file of the resultant values obtained from analysis of data by the multi-data analysis based proactive defect detection and resolution system of FIG. 1, according to an example of the present disclosure;

FIGS. 14 and 15 illustrate pseudo-code related to sentiment analysis by the multi-data analysis based proactive defect detection and resolution system of FIG. 1, according to an example of the present disclosure;

FIGS. 17 and 18 illustrate user sample log data for the multi-data analysis based proactive defect detection and resolution system of FIG. 1, according to an example of the present disclosure;

FIGS. 19A and 19B respectively illustrate user session data and graph details (for each session) for the multi-data analysis based proactive defect detection and resolution system of FIG. 1, according to an example of the present disclosure;

FIG. 26 illustrates further details of the method for multi-data analysis based proactive defect detection and resolution, according to an example of the present disclosure.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

During development of an application, such as a digital application, the application may be tested to ensure that defects are addressed prior to deployment thereof. Once an application is deployed, for example, in an enterprise environment, a known group of users (i.e., consumers) may utilize the application. For example, the known group of users may download the application on their mobile devices or other devices, or otherwise use the application via their mobile devices or other devices without downloading. If a defect is encountered in the application, these users may utilize a predetermined channel to create a defect ticket or bug report, and send the defect ticket or bug report to the entity that developed the application, or to an entity that is tasked to resolve defects related to the application. Examples of defects may include a user's inability to log-in, view a menu, etc., and generally, a user's inability to perform any type of functionality that is supposed to be performed by the application. Based on the relevant service level agreements (SLAs) related to the application, the defect is typically fixed, and the fixed application may be re-deployed.

Figure 2:
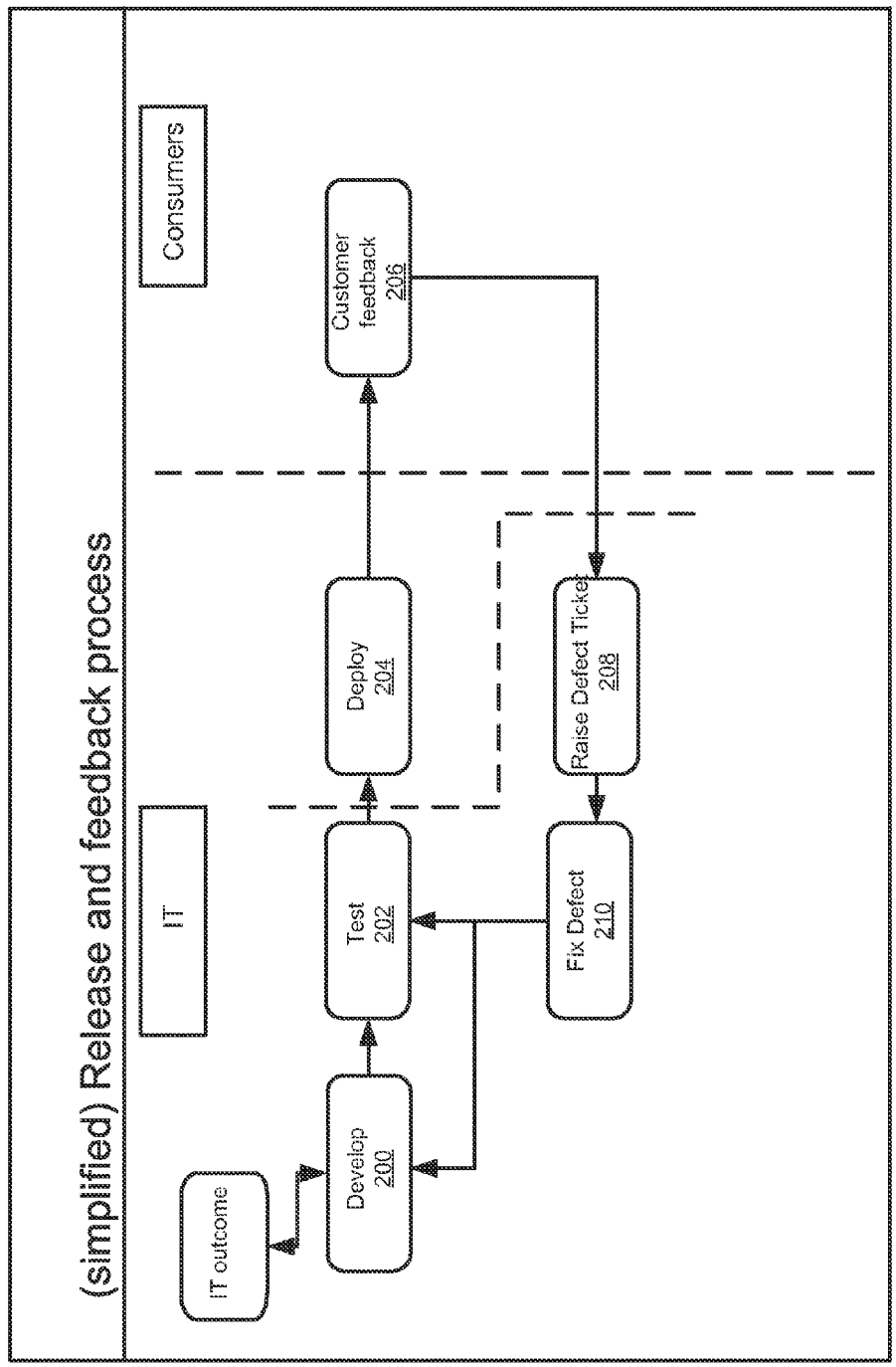
FIG. 2 illustrates an application release and feedback process, according to an example of the present disclosure.

For example, referring to FIG. 2, at block 200, an application may be developed. At block 202, the application may be tested, and at block 204, the application may be deployed. At block 206, based on consumer feedback by a known group of users, at block 208, the known group of users may send a defect ticket or bug report to an application development company through known channels, where the defect may be fixed at block 210, and the fixed application may be re-deployed.

In the digital world outside of an enterprise environment that includes a known group of users, or even in certain enterprise environments that may include a known group of users, the model of FIG. 2 may be disrupted. For example, users may download applications through application stores (e.g., public, or enterprise application stores), and expect the applications to operate correctly at any given time. In the case of a defect, instead of generating a defect ticket or bug report, such users may vent their frustrations on social channels, which may damage the reputation of an enterprise associated with a defective application. For example, in the case of a defect, such users may give a poor rating to an application on a typical 1-5 star rating, and/or add negative comments related to the application. While the intent of such users may be to inform the developer of the application to fix the defect, the negative comments may nevertheless damage the reputation of an enterprise associated with a defective application.

In order to address the aforementioned aspects related to detection and resolution of defects in the digital world outside of an enterprise environment that includes a known group of users, or even in certain enterprise environments that may include a known or an unknown group of users, a multi-data analysis based proactive defect detection and resolution system, and a method for multi-data analysis based proactive defect detection and resolution are disclosed. The system and method disclosed herein may comprise sentiment analysis, natural language processing (NLP) techniques, and analysis of event flow data to determine potential defects, and to trigger a defect resolution process. The sentiment analysis may represent, for example, a positive or negative sentiment of user feedback related to an application. The NLP techniques as described herein may be used to determine functionality of an application associated with a particular user feedback, and the basis for a particular sentiment determination. The event flow data may represent a sequence of functionalities of an application implemented or otherwise encountered by a user (e.g., login, menu, logout, etc., functionalities implemented or otherwise encountered).

The system and method disclosed herein may include the analysis of multiple types of data from various sources to detect defects, and to determine appropriate actions that are to be taken to resolve the defects. According to an example, the system and method disclosed herein may be deployed as a service to utilize data sources such as, for example, application store feedback, release history data, event flow data, and software (i.e., machine readable instructions) engineering data (i.e., application code development data as described herein), and by using application programming interfaces (APIs), the system and method disclosed herein may generate insights and actions to resolve the defects, as well as to provide further guidance for development of an application. The system and method disclosed herein may thus provide a link between data related to consumers that utilize an application and provide feedback, for example, at an application store, data related to operation of the application (e.g., process data), and data related to development of the application and fixing of defects related to the application (i.e., development data). The system and method disclosed herein may also provide for the derivation of insights into the health of an enterprise's systems and processes, and triggering of contextual actions through analytics of multi-dimensional data.

According to an example, system and method disclosed herein may determine whether there is a potential concern with operation of an application. Based on the determination that there is a potential concern with operation of an application (e.g., based on an analysis of a reduction of a particular type of interactions with the application), a trigger (e.g., an indication) may be generated to further investigate operation of the application. The system and method disclosed herein may then perform sentiment and NLP analysis on consumer data including application store feedback data to determine a sentiment of user comments in the application store feedback data, and to further determine a function associated with the application store feedback data. The system and method disclosed herein may then analyze user interaction data with the application to verify the sentiment and NLP analysis on the consumer date. The system and method disclosed herein may further correlate the analysis of the user interaction data with application code development data to generate a defect ticket. The defect ticket may include the particular context of the defect, and an indication of an assignment to an appropriate entity that is to resolve the particular defect. Based on the generation of the defect ticket, the system and method disclosed herein may modify the code of the application to resolve the defect.

The multi-data analysis based proactive defect detection and resolution system and the method for multi-data analysis based proactive defect detection and resolution disclosed herein provide a technical solution to technical problems related, for example, to defect detection and resolution. The system and method disclosed herein provide the technical solution of a data analyzer that is executed by at least one hardware processor (or the data analyzer may be designated as a hardware implemented data analyzer), to analyze operational data for an application to determine whether a functionality related to the application is below a predetermined threshold associated with the functionality related to the application. In response to a determination that the functionality related to the application is below the predetermined threshold associated with the functionality related to the application, the data analyzer may generate an indication to perform defect analysis related to the functionality related to the application. Further, the data analyzer may perform, in response to the generated indication, a sentiment analysis on consumer data related to the application to determine a sentiment of the consumer data related to the application, and a NLP analysis, in response to a determination that the sentiment is a negative sentiment, on the consumer data related to the application to determine a function associated with the negative sentiment. A defect detector that is executed by the at least one hardware processor (or the defect detector may be designated as a hardware implemented defect detector) may analyze, in response to the determination that the sentiment is the negative sentiment, application code and process data related to the application to determine a defect associated with the application by comparing a new user interaction pattern with the application to a previous user interaction pattern with the application, and in response to a determination that the new user interaction pattern with the application is different from the previous user interaction pattern with the application, identifying the defect associated with the application. Further, a defect resolver that is executed by the at least one hardware processor (or the defect resolver may be designated as a hardware implemented defect resolver) may modify a code of the application to correct the defect associated with the application. A defect ticket generator that is executed by the at least one hardware processor (or the defect ticket generator may be designated as a hardware implemented defect ticket generator) may determine a context of the defect associated with the application, determine an entity associated with development of the function associated with the negative sentiment, and generate a defect ticket that includes an indication of the context of the defect associated with the application, and the entity associated with development of the function associated with the negative sentiment.

Figure 1:
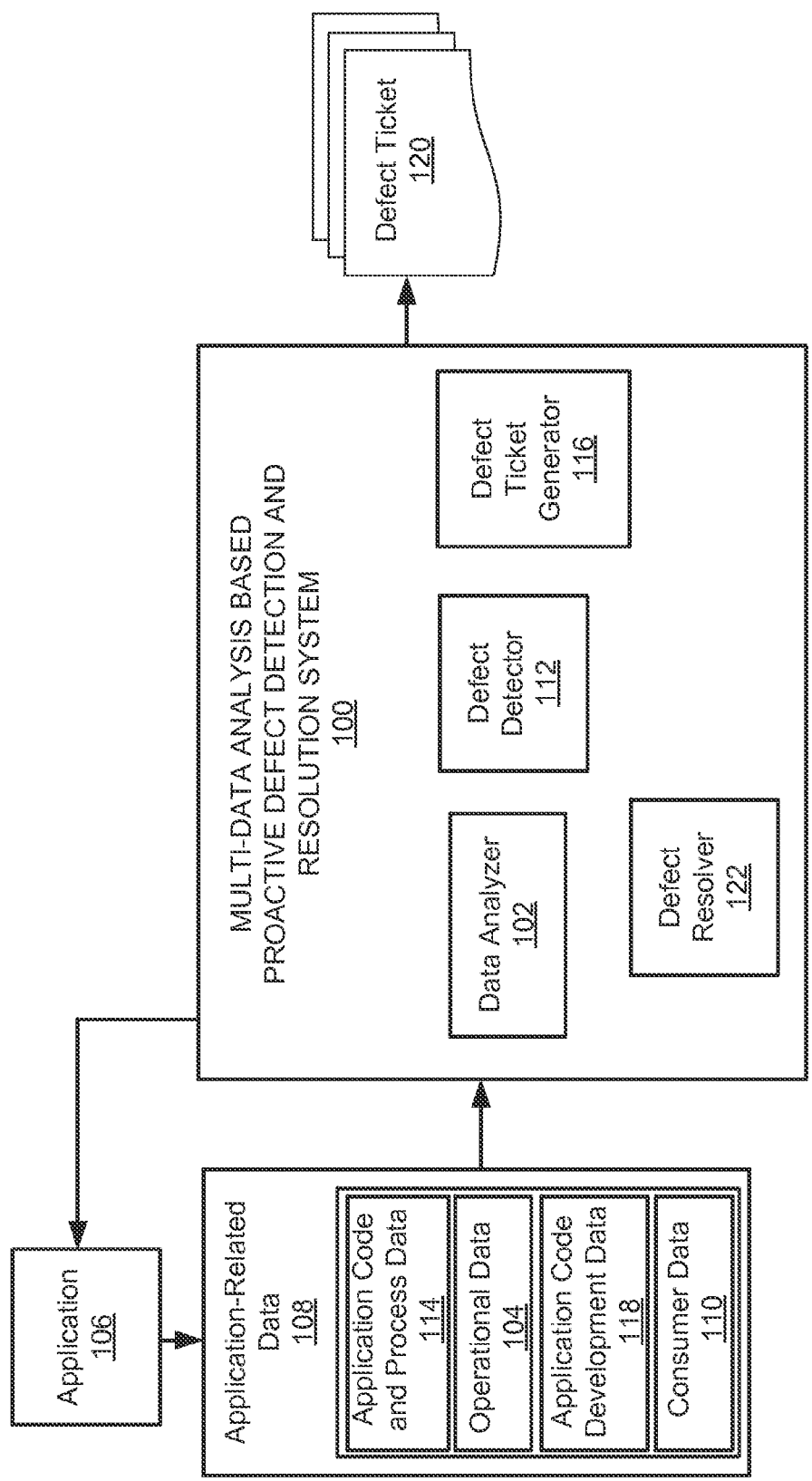
FIG. 1 illustrates a detailed architecture of a multi-data analysis based proactive defect detection and resolution system, according to an example of the present disclosure.

FIG. 1 illustrates a detailed architecture of a multi-data analysis based proactive defect detection and resolution system 100, according to an example of the present disclosure. The multi-data analysis based proactive defect detection and resolution system 100 may include a data analyzer 102 that is executed by at least one hardware processor (e.g., the hardware processor 2702 of FIG. 27), to analyze operational data 104 for an application 106 to determine whether a functionality related to the application 106 is below a predetermined threshold (e.g., a predetermined number of logins) associated with the functionality related to the application 106 (e.g., for a predetermined time period). The operational data 104 may be part of application-related data 108. In response to a determination that the functionality related to the application 106 is below the predetermined threshold associated with the functionality related to the application 106, the data analyzer 102 may generate an indication (e.g., a trigger) to perform defect analysis related to the functionality related to the application 106. Further, the data analyzer 102 may perform, in response to the generated indication, a sentiment analysis on consumer data 110 related to the application 106 to determine a sentiment of the consumer data 110 related to the application 106, and a NLP analysis, in response to a determination that the sentiment is a negative sentiment, on the consumer data 110 related to the application 106 to determine a function (e.g., login, logout, etc.) associated with the negative sentiment.

A defect detector 112 that is executed by the at least one hardware processor may analyze, in response to the determination that the sentiment is the negative sentiment, application code and process data 114 related to the application 106 to determine a defect associated with the application 106 by comparing a new user interaction pattern with the application 106 to a previous user interaction pattern with the application 106, and in response to a determination that the new user interaction pattern with the application 106 is different from the previous user interaction pattern with the application 106, identifying the defect associated with the application 106.

A defect ticket generator 116 that is executed by the at least one hardware processor may determine a context of the defect associated with the application 106, determine an entity associated with development of the function associated with the negative sentiment (e.g., based on application code development data 118), and generate a defect ticket 120 that includes an indication of the context of the defect associated with the application 106, and the entity associated with development of the function associated with the negative sentiment.

A defect resolver 122 that is executed by the at least one hardware processor may modify a code of the application 106 to correct the defect associated with the application 106.

Figure 3:
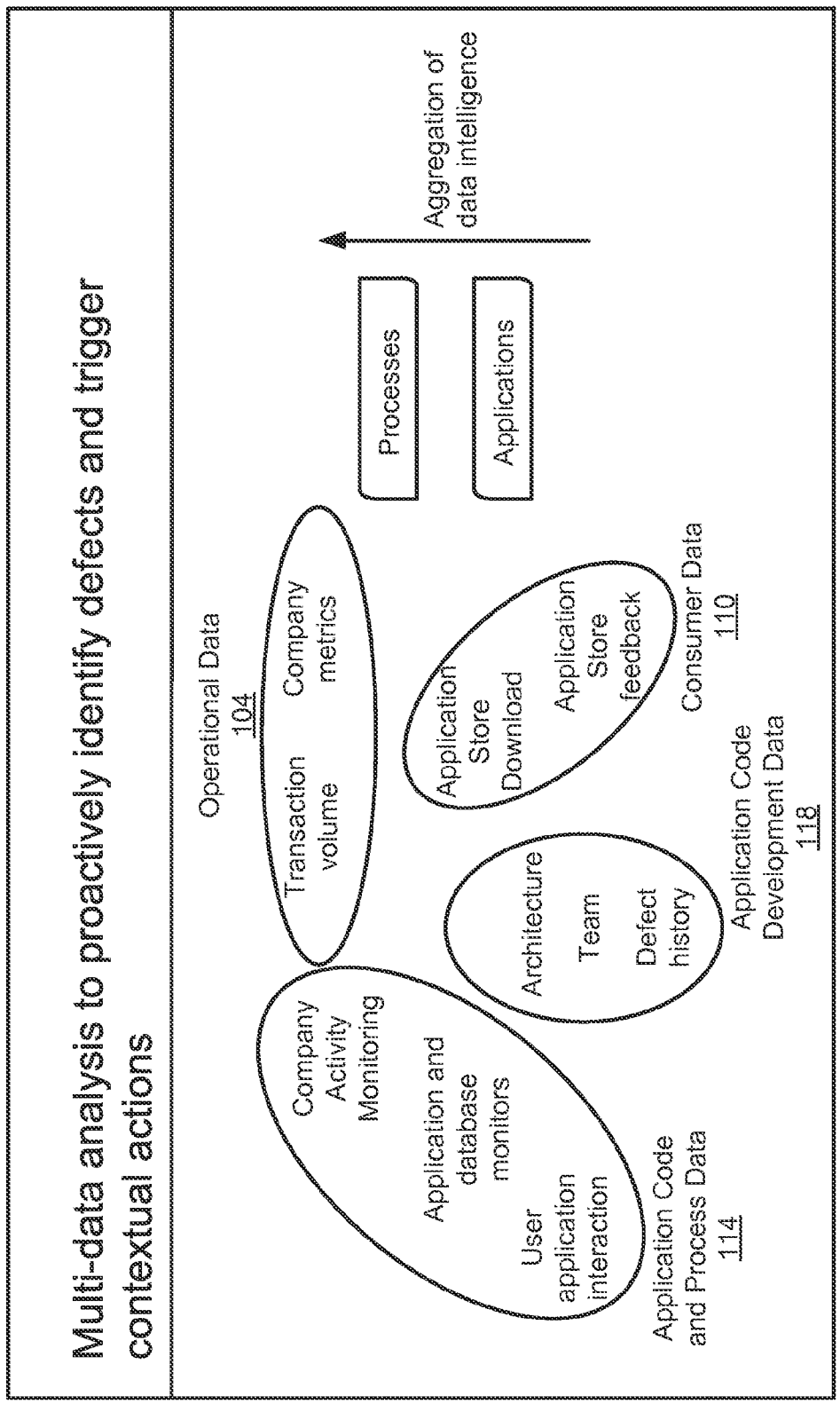
FIG. 3 illustrates multi-data analysis to proactively identify defects and trigger contextual actions for the multi-data analysis based proactive defect detection and resolution system of FIG. 1, according to an example of the present disclosure.

FIG. 3 illustrates multi-data analysis to proactively identify defects and trigger contextual actions for the system 100, according to an example of the present disclosure.

Referring to FIG. 3, the application-related data 108 analyzed by the data analyzer 102, the defect detector 112, the defect ticket generator 116, and the defect resolver 122, may include the application code and process data 114, the operational data 104, the application code (i.e., machine readable instructions) development data 118, and the consumer data 110. The application code and process data 114 may include data related to user application interaction that captures data related to a user interaction with a predetermined operation (e.g., a login operation, navigation to different pages, etc.) of the application 106, application and database monitors that include data related to performance or activities related to the application 106 and any related database, and company activity monitoring data related to the activities of a particular company associated with the application 106. The operational data 104 may include transaction volume data that represents a number of transactions related to the application 106, and company metrics related to a company associated with the application 106. The application code development data 118 may include data related to an architecture of the application 106, a development team associated with the application 106, and a defect history associated with the application 106. The consumer data 110 may include application store download data that represents a number of downloads for a deployed version of the application 106, and application store feedback data that represents a type of feedback (e.g., positive, negative, scaled (on a scale of 0-5), etc.) related to the application 106.

Figure 4:
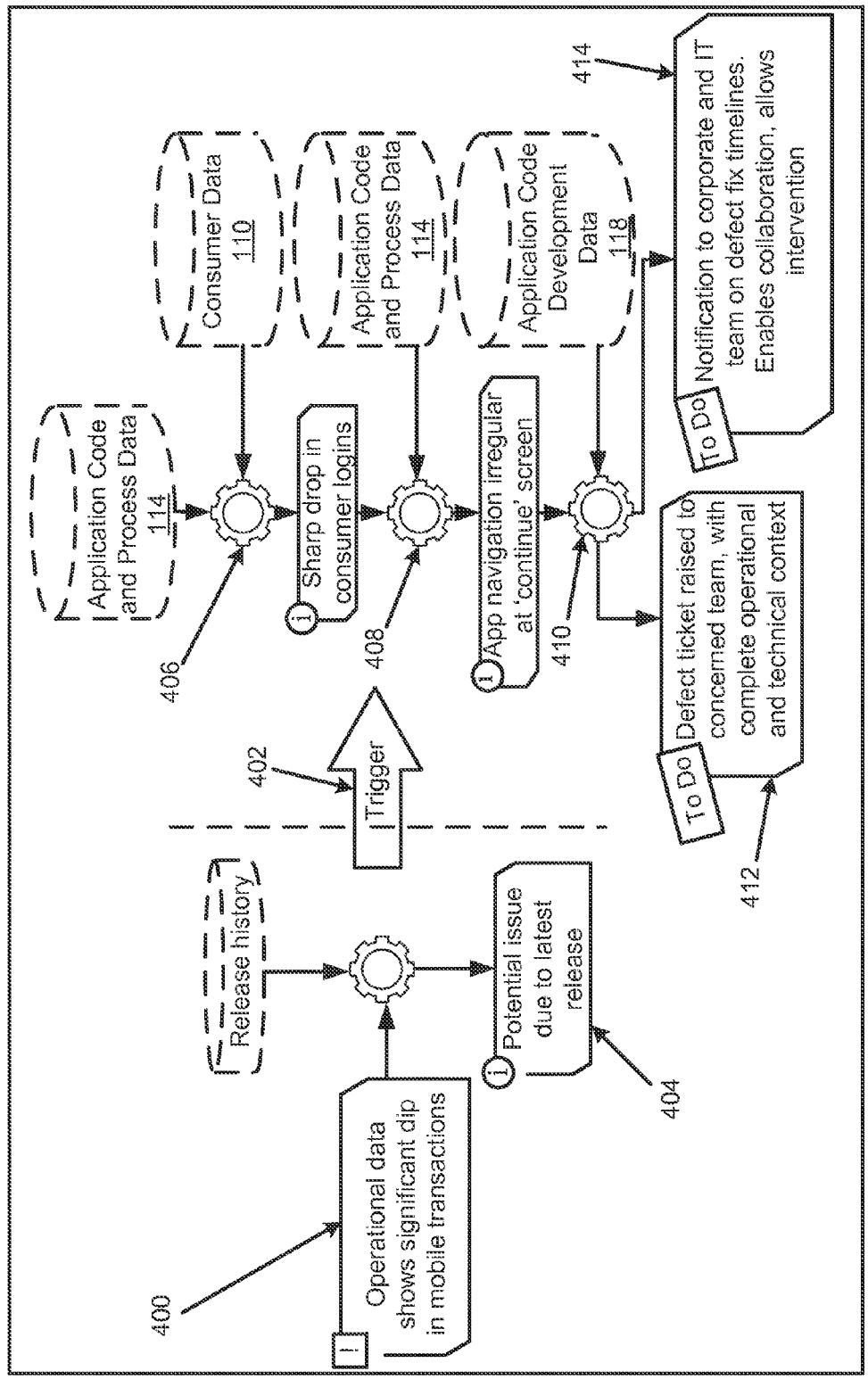
FIG. 4 illustrates application code intelligence to mitigate a negative impact, according to an example of the present disclosure.

FIG. 4 illustrates application code intelligence to mitigate a negative impact, according to an example of the present disclosure.

Referring to FIG. 4, according to a particular example, at 400, the data analyzer 102 may analyze the operational data 104, which may show a significant dip in mobile transactions for an application 106. In this regard, although the analysis illustrated in FIG. 4 is tailored to mobile transactions, the operational data 104 may be analyzed for any type of transactions related to the application 106.

Based on the analysis of the operational data 104, if a number of the transactions are below a predetermined threshold for a specified amount of time, at 402, a trigger (e.g., an indication) may be generated by the data analyzer 102 for further analysis of the application-related data 108.

For the example of FIG. 4, at 404, the drop in the number of transactions may be correlated with a release history of the application 106. For example, assuming a new version of the application 106 has been released, and the drop in the number of transactions occurred after the release of the new version of the application 106, then the drop in the number of transactions may be correlated with the new version of the application 106.

Based on the generation of the trigger at 402, at 406, the data analyzer 102 may analyze the application code and process data 114 and the consumer data 110. For example, the application code and process data 114 may include machine readable instructions and process data related to the application 106, and the consumer data 110 may include application store feedback data. In this regard, the data analyzer 102 may perform a sentiment and functional analysis on the consumer data 110. The sentiment analysis on the consumer data 110 may be used, for example, to determine a sentiment (e.g., a positive or negative sentiment) of the application store feedback data (i.e., a sentiment of the text of the application store feedback data). The functional analysis may be used to determine a function associated with the application 106 that is being addressed in the application store feedback data. For example, the function associated with the application 106 may pertain to logins related to the application 106. The functions associated with the application 106 may be ascertained based on a comparison of language of the application store feedback data (e.g., based on a NLP analysis of the application store feedback data) to a catalog of known functions (e.g., login, logout, etc.) associated with the application 106. The catalog of the known functions may be described as a set of tags or keywords that are associated with known functions associated with the application 106, where the tags or keywords may be matched to the language of the application store feedback data. Thus, the functionality analysis of the application store feedback data may be used to determine the cause of the sentiment of the application store feedback data.

For the example of FIG. 4, the sentiment and functionality analysis at 406 may be used to determine, for example, a sharp drop in consumer logins, and a sentiment associated with the drop in consumer logins.

At 408, the defect detector 112 may further analyze the application code and process data 114 to determine a defect associated with the application 106. For example, the defect detector 112 may further analyze user application interaction data related to the user interaction with the application 106. For example, the defect detector 112 may compare the typical user interaction pattern before the release of the application 106 to the user interaction pattern after the release of the application 106. Based on this analysis, the defect detector 112 may determine that the user interaction is irregular (e.g., broken), for example, at the "continue" screen (i.e., the user cannot perform an action that they were previously able to perform, or should be able to perform).

At 410, the defect ticket generator 116 may determine an entity (e.g., person, company, team, etc.) that worked on the particular application 106, and/or the particular defective functionality associated with the application 106. For the example of FIG. 4, the defect ticket generator 116 may analyze the application code development data 118 to determine the particular developers that developed the "continue" screen functionality for the application 106. At 412, the defect ticket generator 116 may generate the defect ticket 120 to a concerned team, with complete operation and technical context information related to the defect. The technical context information may include, for example, a development date of the application and/or functionality, the specific functionality that is defective, etc. Further, at 414, the defect ticket generator 116 may generate the defect ticket 120 to the corporate and an information technology (IT) team with respect to defect fixing timelines, to thus provide for collaboration with the IT team and intervention related to operation of the application 106. For example, the intervention may include an identification of alternate functionality for the application 106 that may be used during resolution of a particular defect. Alternatively, the intervention may include modification of code related to the application 106 to correct the defective functionality associated with the application 106.

The defect resolver 122 may modify code (i.e., machine readable instructions) of the application 106 to correct the defect associated with the application 106.

For example, the defect resolver 122 may localize the defect within a single file of a module. Based on static analysis of the file, functionality implemented in that file and a knowledge base of known machine readable instruction patterns, the defect resolver 122 may correct a defect associated with the application 106. For example, the defect resolver 122 may correct a defect associated with the application 106 if the application 106 uses a known application programming interface (API) for invoking a web service for authentication. Static analysis of the file invoking this API may show that the parameters passed to the web service are inaccurate, for example there is an error in the uniform resource locator (URL) of the web service. The defect resolver 122 may analyze and transform the machine readable instructions, and change the URL specified in the defective machine readable instructions.

After making a change, the defect ticket generator 116 may generate a ticket and assign the task of testing the modified machine readable instructions to appropriate development and testing team members. Modification of machine readable instructions by the defect resolver 122 may reduce the time to localize, determine the defect fix, and apply the fix.

The defect resolver 122 may also generate information that provides context to developers and testers to facilitate rapid defect resolution, and/or utilize the context for defect resolution. For example, the technical context may be used to localize areas within the application 106 that have potentially led to the defect. For example, a defect reported by users through application store feedback in login functionality may tend to be localized in application modules that participate in the login process.

In order to localize defects, with respect to the catalog of functions that may be used to identify if users are reporting functional defects in their feedback, this catalog of functions may also be used to create a traceability between functions and application modules where that functionality is implemented. During application design time, this extended catalog may be generated and maintained. A form of the catalog schema that may be used to document this information is <function, {app module_1, [module_file, module_file . . . ]} . . . {app_module_n, [module_file, module_file . . . ]}. Using this information, the defect resolver 122 may reduce the application machine readable instruction exploration phase so as to focus on a much smaller subset of the application machine readable instructions for resolving a defect. Similarly, a traceability between functions, modules and test scripts may provide for the selection of a subset of test scripts for regression testing and other testing efforts.

In cases where the extended catalog maintenance is not performed, the defect resolver 122 may execute a query on the application machine readable instructions to identify modules and module files where the defective functionality may be implemented. For example, if users report a defective login functionality, the defect resolver 122 may execute a query with a single word 'login' over the application machine readable instructions. The defect resolver 122 may expand the query by including synonyms of the functional keyword. Synonyms may include those from a language-specific thesaurus or a domain taxonomy.

In addition to localization to modules and module files, the defect resolver 122 may also use available architectural information such as control flow graphs or data flow graphs to provide additional context.

The defect resolver 122 may be configured to operate on multiple information sources, such as, for example, an extended functional catalog, a domain taxonomy, flow graphs, etc. In this manner, the capabilities of the defect resolver 122 may be extended or configured for each application.

Referring to FIG. 4, the defect ticket generation at 412 and 414 may also be performed based on sentiment and functionality analysis, as opposed to being initiated at 402 by the trigger related to the operational data 104.

FIG. 5 illustrates application metric data for an application, according to an example of the present disclosure.

Referring to FIG. 5, the application metric data may include data related to an application store, and may be derived from the application store download data of the consumer data 110. For the example of FIG. 5, the application metric data may include an application version number at 500, a week number at 502, an average rating at 504, a change in rating at 506, a number of downloads at 508, a number of updates at 510, and a number of transactions at 512, with each of the aspects of FIG. 5 being related to the application 106. The various types of data at 502-512 may be linked to the particular version of the application 106 at 500.

FIG. 6 illustrates release transition data, according to an example of the present disclosure.

Referring to FIG. 6, the release transition data may provide an indication of a number of users that are using a new version, compared to a previous version of the application, and may be derived from the application store download data of the consumer data 110. For example, the release transition data may include a version number at 600, a number of updates at 602, a number of downloads at 604, a total number of users at 606, and users in previous versions at 608, with each of the aspects of FIG. 6 being related to the application 106.

FIG. 7 illustrates release change data for an application, according to an example of the present disclosure.

Referring to FIG. 7, the release change data may include an indication of changes to a particular application, and may be derived from the application code development data 118. For example, the release change data may include a version number at 700, a release date at 702, an indication of a major change at 704, and details (e.g., what feature was changed, was a new feature added, etc.) related to the changes at 706, with each of the aspects of FIG. 7 being related to the application 106.

FIG. 8 illustrates release metric data, according to an example of the present disclosure.

Referring to FIG. 8, the release metric data may include metrics related to various released versions of the application 106, and may be derived from the application code development data 118. For example, the release metric data may include a version number at 800, a release date at 802, a number of weeks in the market for a particular version of the application 106 at 804, a total number of users at a particular release date of the application 106 at 806, an active number of users at 808 (e.g., users that download the application 106 and actually use it), an average number of downloads for the application 106 at 810, and an average number of updates related to the application 106 at 812.

The release metric data may also be used to assign different criticality levels to a particular defect determination and resolution by the defect detector 112 and defect resolver 122 as described herein. For example, if a limited number of users (e.g., 100 users) have downloaded and/or updated to a new version of the application 106, then the criticality of the particular defect determination may be lower than a scenario where a significant number of users (e.g., 10000 users) have downloaded and/or updated to a new version of the application 106.

Figure 9:
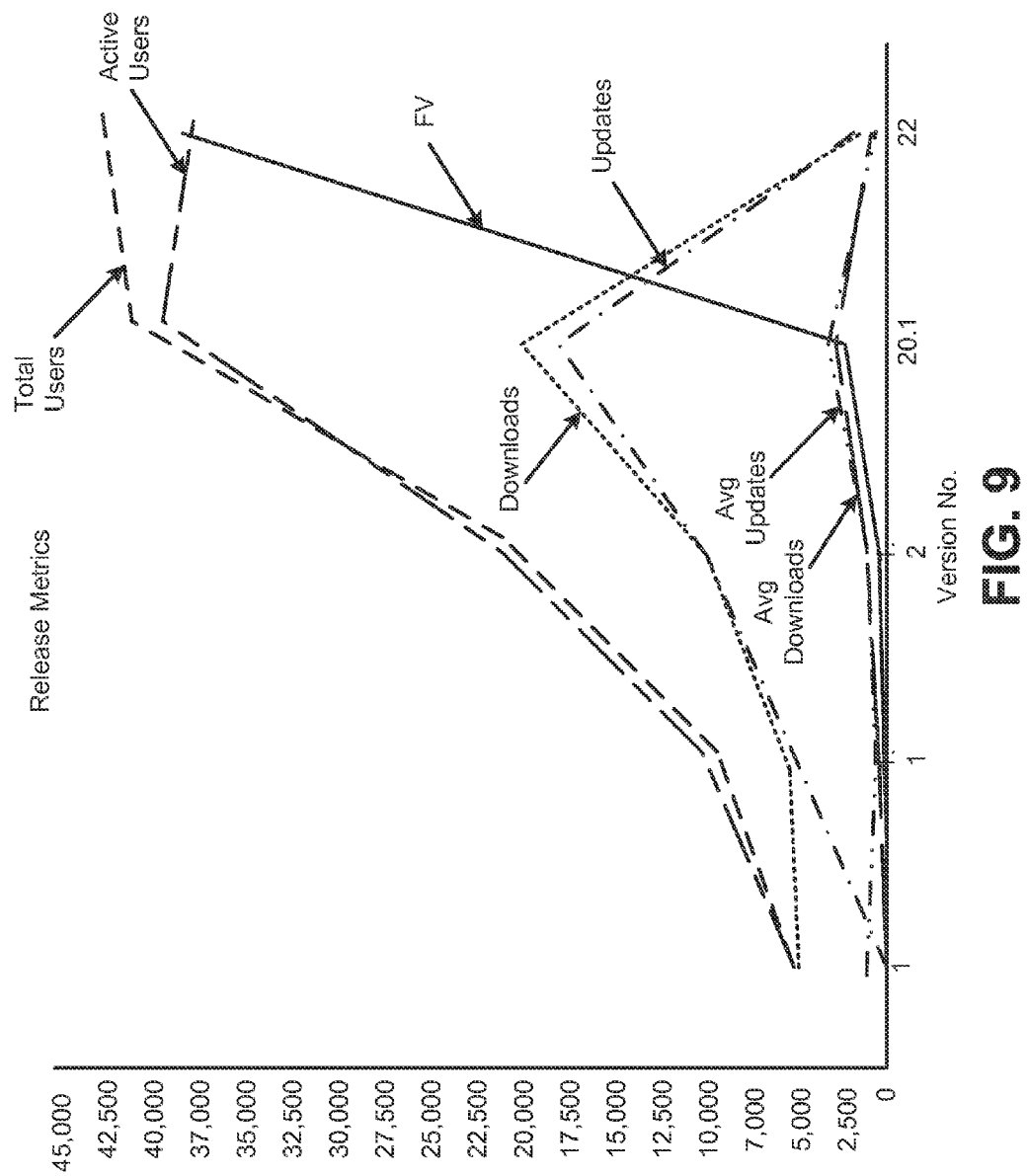
FIG. 9 illustrates a graph of statistical representation of release metric data, according to an example of the present disclosure.

FIG. 9 illustrates a graph of statistical representation of release metric data, according to an example of the present disclosure.

Referring to FIG. 9, the release metric data of FIG. 8 may be graphically depicted to illustrate various trends and other statistical properties related to the release of a particular version of the application 106.

Figures 10, 11:
FIG. 10 illustrates a user-interface display of a defect analysis by the multi-data analysis based proactive defect detection and resolution system of FIG. 1, according to an example of the present disclosure.
FIG. 11 illustrates pseudo-code for generation of a danger score related to a defect analysis by the multi-data analysis based proactive defect detection and resolution system of FIG. 1, according to an example of the present disclosure.

FIG. 10 illustrates a user-interface display of a defect analysis by the system 100, according to an example of the present disclosure.

Referring to FIG. 10, based, for example, on the operational data 104 analysis by the data analyzer 102, a danger score may be determined. The danger score may represent a level of potential issues with a particular release of the application 106. For example, FIG. 11 illustrates pseudo-code for generation of the danger score related to a defect analysis by the system 100, according to an example of the present disclosure. Referring to FIG. 11, the danger score may be determined between a scale of 1-10, where a danger score of 0 indicates proper functionality of the application 106 (e.g., indicated as "App is perfectly functional!"), a danger score greater than 0 and less than 5 indicates potential issues related to functionality of the application 106 (e.g., indicated as "WARNING! App might be facing issues."), a danger score greater than 5 and less than 7 identifies possible negative reviews and provides an indication to begin monitoring of the functionality of the application 106 (e.g., indicated as "WARNING! Reviews going down. Start monitoring app."), and a danger score greater than 7 indicates issues related to functionality of the application 106 (e.g., indicated as "WARNING! Issue with latest release. Take immediate action."). With respect to danger score determination, the danger score may be dependent on a set of parameters that include changeInAverageDownloadsPostRelease, changeInAverageUpdatesPostRelease, inactiveUsersPostRelease-inactiveUsersPreRelease, avgTransactionsPreRelease-avgTransactionsPostRelease, avgRevenuePerWeekPreRelease-avgRevenuePerWeekPostRelease, and changeInRating.

With respect to the changeInAverageDownloadsPostRelease parameter, if the average downloads of a new release decrease, this parameter may operate as an indicator of poor user response and satisfaction that leads to reduced downloads.

With respect to the changeInAverageUpdatesPostRelease parameter, while the changeInAverageDownloadsPostRelease parameter captures new download activity, the changeInAverageUpdatesPostRelease parameter may capture how many users are updating their older application versions. If the general sentiment of users is poor, then users may prefer to use older application versions and wait for a more stable application release in the future.

With respect to the inactiveUsersPostRelease-inactiveUsersPreRelease parameter, this parameter may indicate how many users have stopped using the application since the current release update.

With respect to the avgTransactionsPreRelease-avgTransactionsPostRelease parameter, this parameter may capture a number of transactions (e.g., checking of account balance in a banking application) that are executed successfully.

With respect to the avgRevenuePerWeekPreRelease-avgRevenuePerWeekPostRelease parameter, this parameter may operate as a metric, for example, for revenue generation through an application.

With respect to the changeInRating parameter, this parameter may capture user sentiments through application store ratings that customers provide.

For each of the above parameters, specific thresholds may be set. Further, the priorities for each parameter may also be set. Based on the thresholds and priorities, once a metric crosses (e.g., exceeds) the threshold, the dangerScore may be updated as per the priority. For example, for a normal priority, the danger score may be incremented by one, but for a high priority, the danger score may be incremented by two. The granularity of determining these metrics may be set to a predetermined time period, such as, for example, a day, a week, a fortnight, etc., so that transient user behavior may be averaged, and the metrics may represent a consistent interpretation of quality of the application release, and acceptance by users.

The determination of the metrics may be based on release data, release transition data, user sentiment data, and other metrics/data.

The indications related to the danger score may be user configurable.

As disclosed herein with reference to FIG. 4, the danger score may also be used as the trigger at 402 to perform further analysis of the application code and process data 114, the consumer data 110, and the application code development data 118 (e.g., see also 1100 at FIG. 11).

FIG. 12 illustrates an Extensible Markup Language (XML) file of the resultant values obtained from analysis of data by the system 100, according to an example of the present disclosure.

Referring to FIG. 12, the XML file of the resultant values may indicate, for example, a version number of the particular application 106 at 1200, various metrics related to the particular application 106 at 1202, a danger level at 1204, and defects that have been fixed at 1206. The XML file of the resultant values may be related to the particular example of operation of the system 100 as described herein with reference to FIGS. 13-24.

Figure 13:
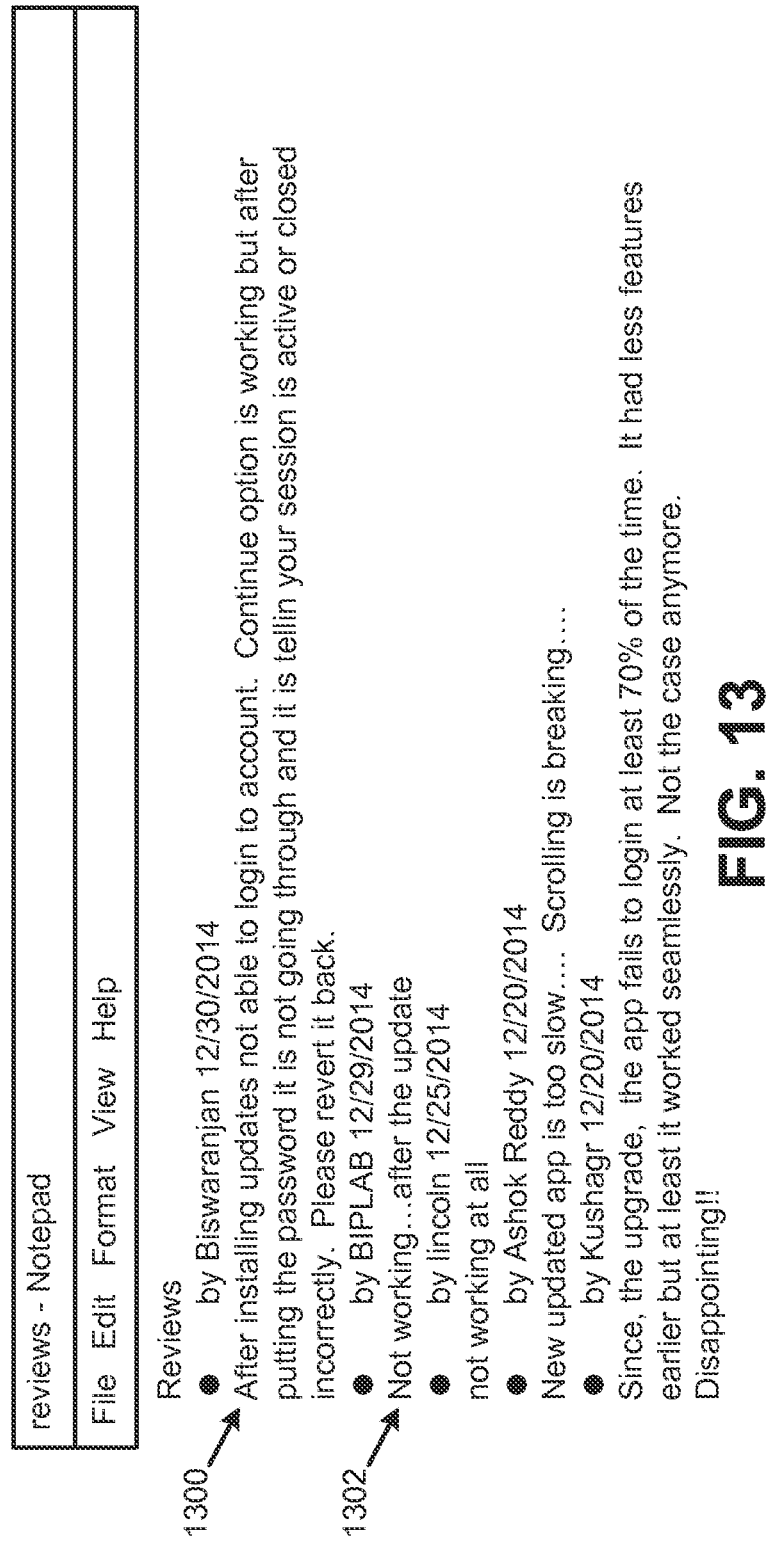
FIG. 13 illustrates application score feedback for sentiment analysis by the multi-data analysis based proactive defect detection and resolution system of FIG. 1, according to an example of the present disclosure.

FIG. 13 illustrates application score feedback for sentiment analysis by the system 100, according to an example of the present disclosure.

Referring to FIG. 13, according to a particular example of operation of the system 100, the application score feedback of the consumer data 110 may include various user comments, such as, "After installing updates not able to login to account. Continue option is working but after putting the password it is not going through and it is telling your session is active or closed incorrectly. Please revert it back" at 1300, "Not working . . . after the update" at 1302, etc.

FIGS. 14 and 15 illustrate pseudo-code related to sentiment analysis by the system 100, according to an example of the present disclosure.

Referring to FIG. 14, the sentiment analysis performed by the data analyzer 102 may analyze the user comment 1300 to determine a sentiment score of −0.2847 at 1400, to thus identify the user comment 1300 as including a negative sentiment at 1402. The data analyzer 102 may further apply NLP to identify the basis for the negative sentiment as "not able" at 1404. Similarly, referring to FIG. 15, the sentiment analysis performed by the data analyzer 102 may analyze the user comment 1302 to determine a sentiment score of −0.3377 at 1500, to thus identify the user comment 1302 as including a negative sentiment at 1502. The data analyzer 102 may further apply NLP to identify the basis for the negative sentiment as "not working" at 1504.

Figure 16:
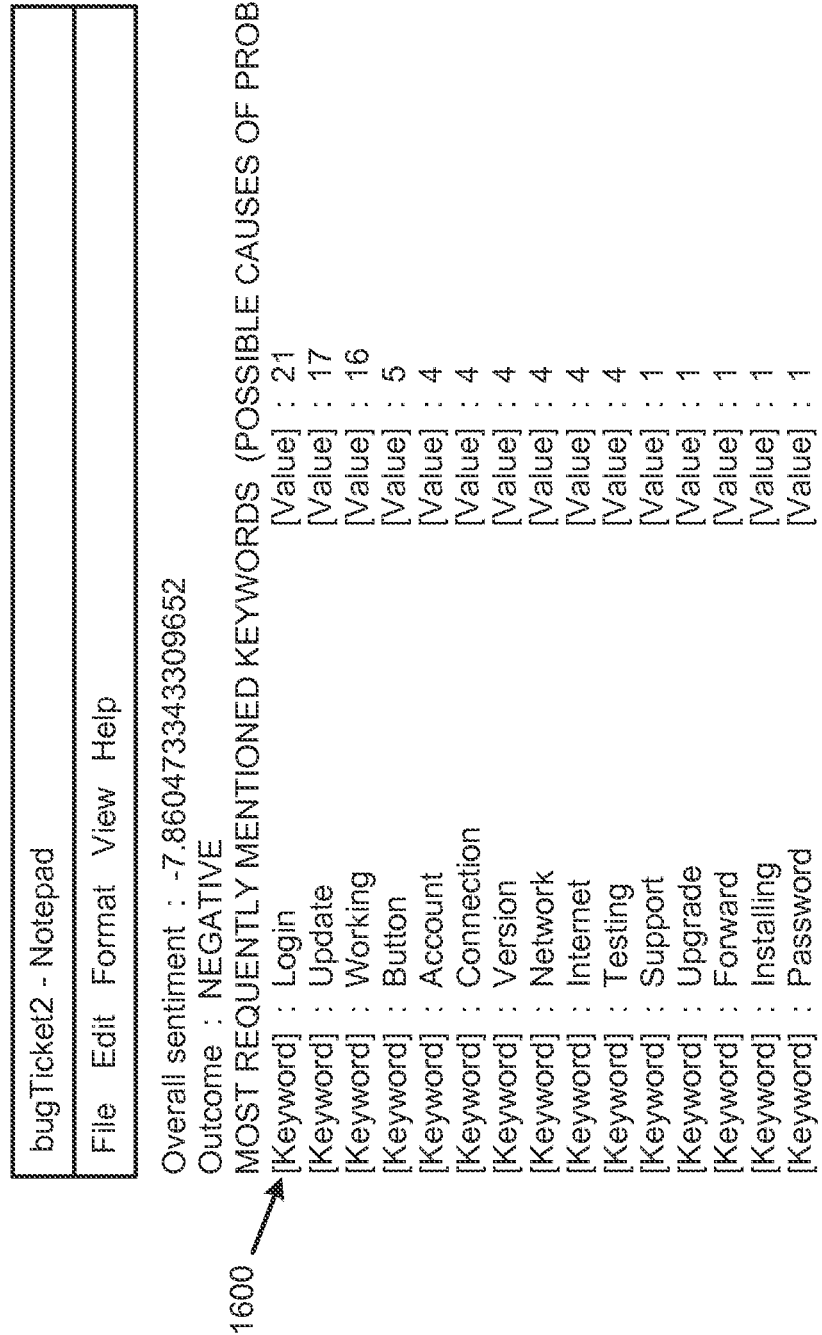
FIG. 16 illustrates an output of sentiment analysis by the multi-data analysis based proactive defect detection and resolution system of FIG. 1, according to an example of the present disclosure.

FIG. 16 illustrates an output of sentiment analysis by the system 100, according to an example of the present disclosure.

Referring to FIG. 16, the data analyzer 102 may next perform a functional analysis to determine a function associated with the application 106 that is being addressed in the application store feedback data. For example, the function associated with the application 106 may pertain to logins related to the application 106. The functions associated with the application 106 may be ascertained based on a comparison of language of the application store feedback data (e.g., based on NLP of the application store feedback data) to a catalog of known functions (e.g., login, update, working, etc.) associated with the application 106. As described herein, the catalog of the known functions may be described as a set of tags or keywords that are associated with known functions associated with the application 106, where the tags or keywords may be matched to the language of the application store feedback data. Thus the functionality analysis of the application store feedback data may be used to determine the cause of the sentiment of the application store feedback data. For the example of FIGS. 13-15, based on the analysis of the application store feedback data, at 1600, the keyword "login" may be determined to include a highest score of "21" compared to other keywords based on the functionality analysis of the application store feedback data to determine most frequently mentioned keywords. Thus, for the example of FIGS. 13-15, the most frequently mentioned keyword "login" may be identified by the data analyzer 102 as the most likely function that is associated with (or otherwise the reason for) the negative sentiment.

FIGS. 17 and 18 illustrate user sample log data for the system 100, according to an example of the present disclosure. Further, FIGS. 19A and 19B respectively illustrate user session data and graph details (for each session) for the system 100, according to an example of the present disclosure.

Referring to FIG. 17, as described herein with reference to FIG. 4, at 408, the defect detector 112 may further analyze the application code and process data 114 to determine a defect associated with the application 106. For the example, the defect detector 112 may further analyze the user application interaction data 1700 related to user interaction with the application 106. For example, the defect detector 112 may compare the typical user interaction pattern before the release of the application 106 to the user interaction pattern after the release of the application 106. Based on this analysis, the defect detector 112 may determine that the user interaction is irregular (e.g., broken), for example, at a particular screen (e.g., the "continue" screen for the example of FIG. 4). For example, at 1702, the defect detector 112 may determine that at 11:00:00 am, user 1001 for session 96001 performs a login, at 11:02:02 am, user 1001 for session 96001 accesses a menu, and at 11:05:05 am, user 1001 for session 96001 performs a logout. Thus for each user session (e.g., sessions 98888, 58882, 98889, etc., for the example of FIG. 17), the defect detector 112 may analyze an interaction of each particular user (e.g., user 1000, user 1001, user 1002, etc., for the example of FIG. 17) with the application 106.

Referring to FIG. 18, the data of FIG. 17 may be represented in a NoSQL database as shown in FIG. 18. Referring to FIGS. 19A and 19B, based on processing of the data of FIGS. 17 and 18, the data of FIGS. 17 and 18 may be represented as shown to include user session data (FIG. 19A), and graph details (for each session) for FIG. 19B. The graph details may be used to generate the graphs of FIG. 20.

Figure 20:
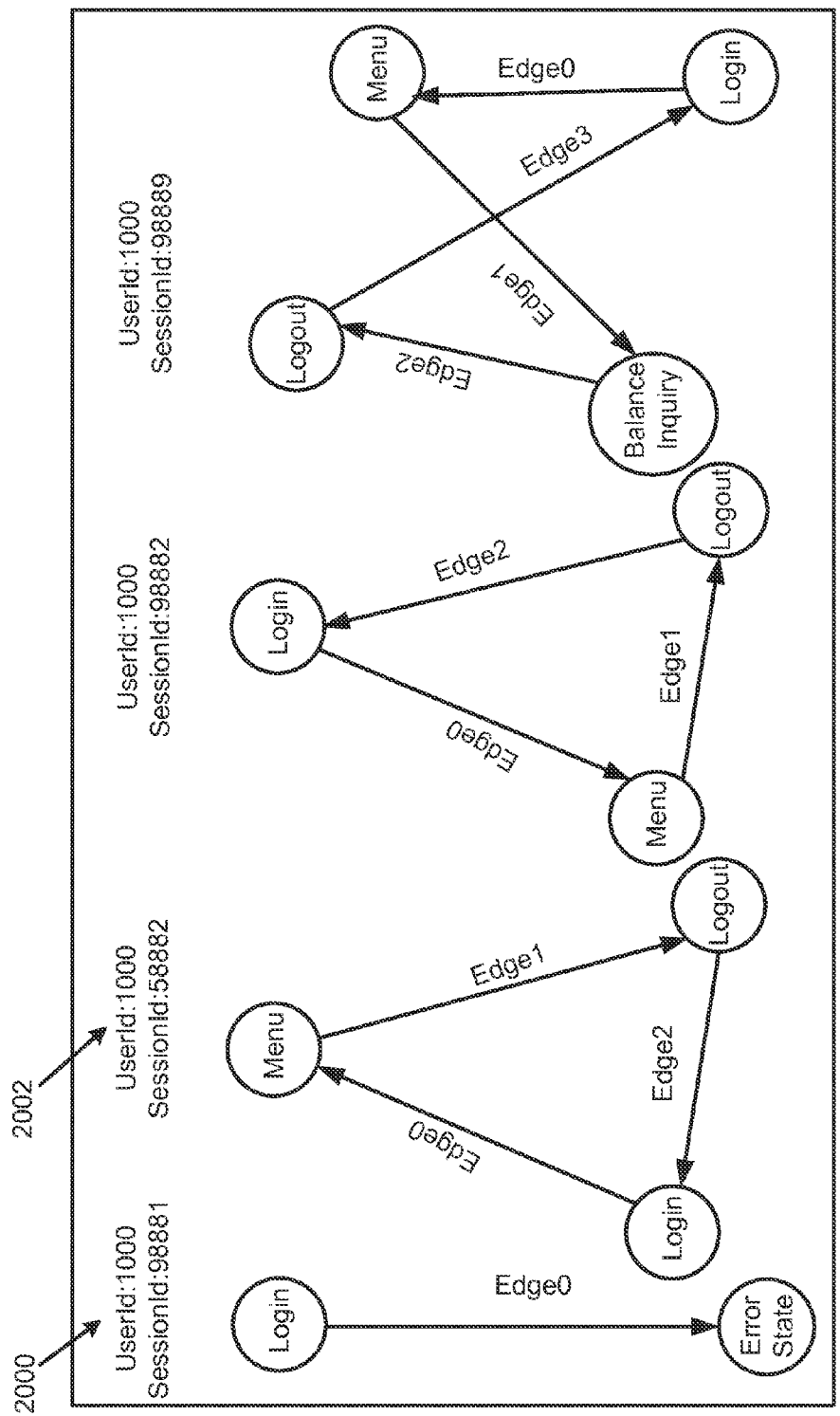
FIG. 20 illustrates graphs of a user navigation with different session identifications (IDs) for the multi-data analysis based proactive defect detection and resolution system of FIG. 1, according to an example of the present disclosure.

FIG. 20 illustrates graphs of a user navigation with different session IDs for the system 100, according to an example of the present disclosure.

Referring to FIG. 20, each session (e.g., sessionID 98881, 58882, 98882, and 98889 for the example of FIG. 20) belonging to a particular user (e.g., userID 1000 for the example of FIG. 20) may be represented in a graph format. For example, at 2000, the sessionID 98881 includes a login followed by an error state. At 2002, the sessionID 58882 includes a login followed by an access to a menu, and further followed by a logout, and so forth for other sessionIDs. Thus, the defect detector 112 may analyze the raw data (e.g., the user application interaction data 1700) related to the user interaction with the application 106, and represent this raw data as a graph for each session of the user interaction.

Figure 21:
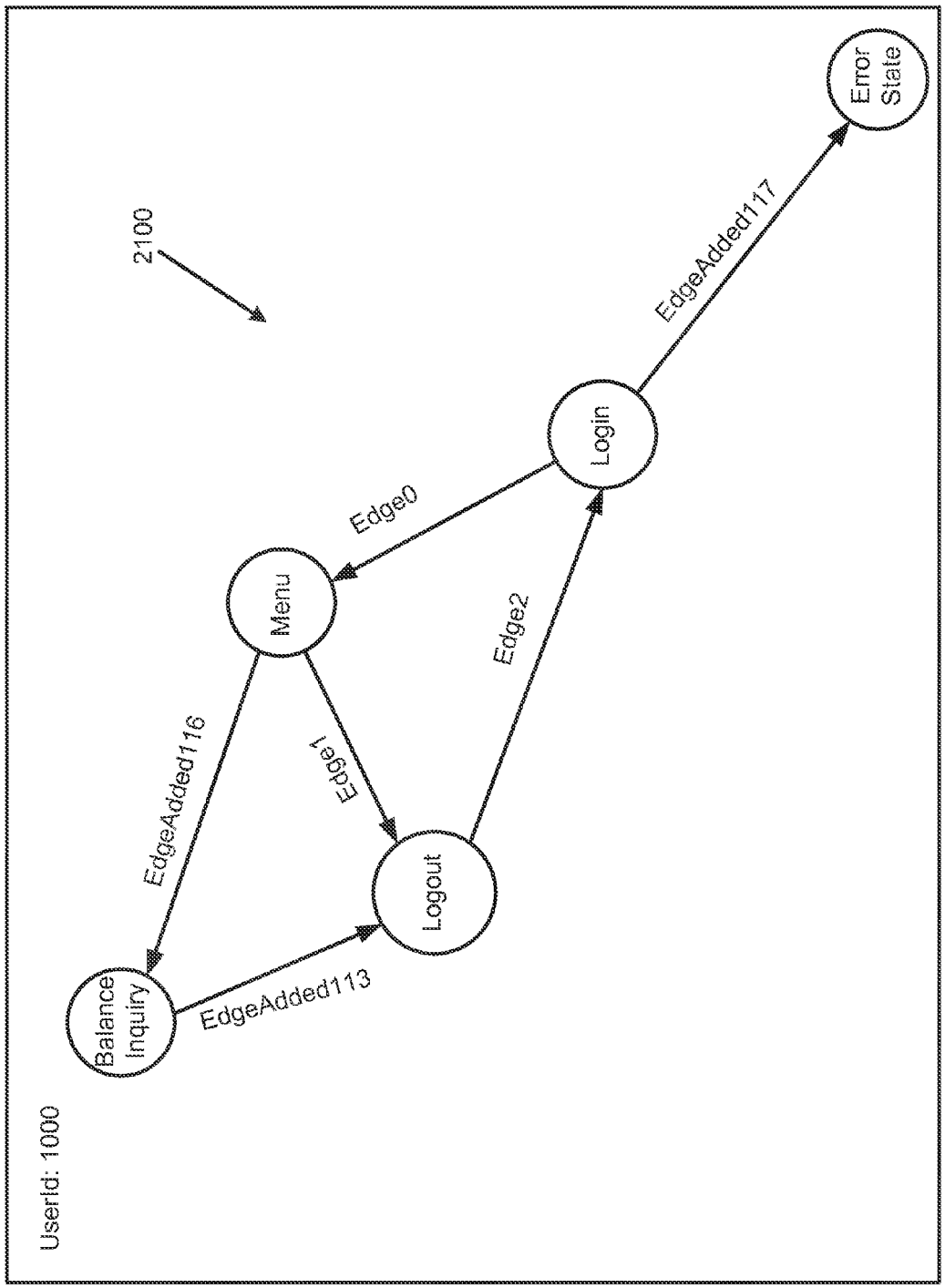
FIG. 21 illustrates a graph at user level for the multi-data analysis based proactive defect detection and resolution system of FIG. 1, according to an example of the present disclosure.

FIG. 21 illustrates a graph at user level for the system 100, according to an example of the present disclosure.

Referring to FIG. 21, the defect detector 112 may represent the graphs of the user interaction with the application 106 (e.g., the graphs of FIG. 20), and combine the graphs to generate a merged graph at a user level (i.e., a user-level graph). For example, for the userID 1000 for the example of FIG. 20, the merged user-level graph is illustrated as 2100. In this regard, the defect detector 112 may merge common nodes of the graphs for each session for a given user to generate the merged user-level graph.

Figure 22:
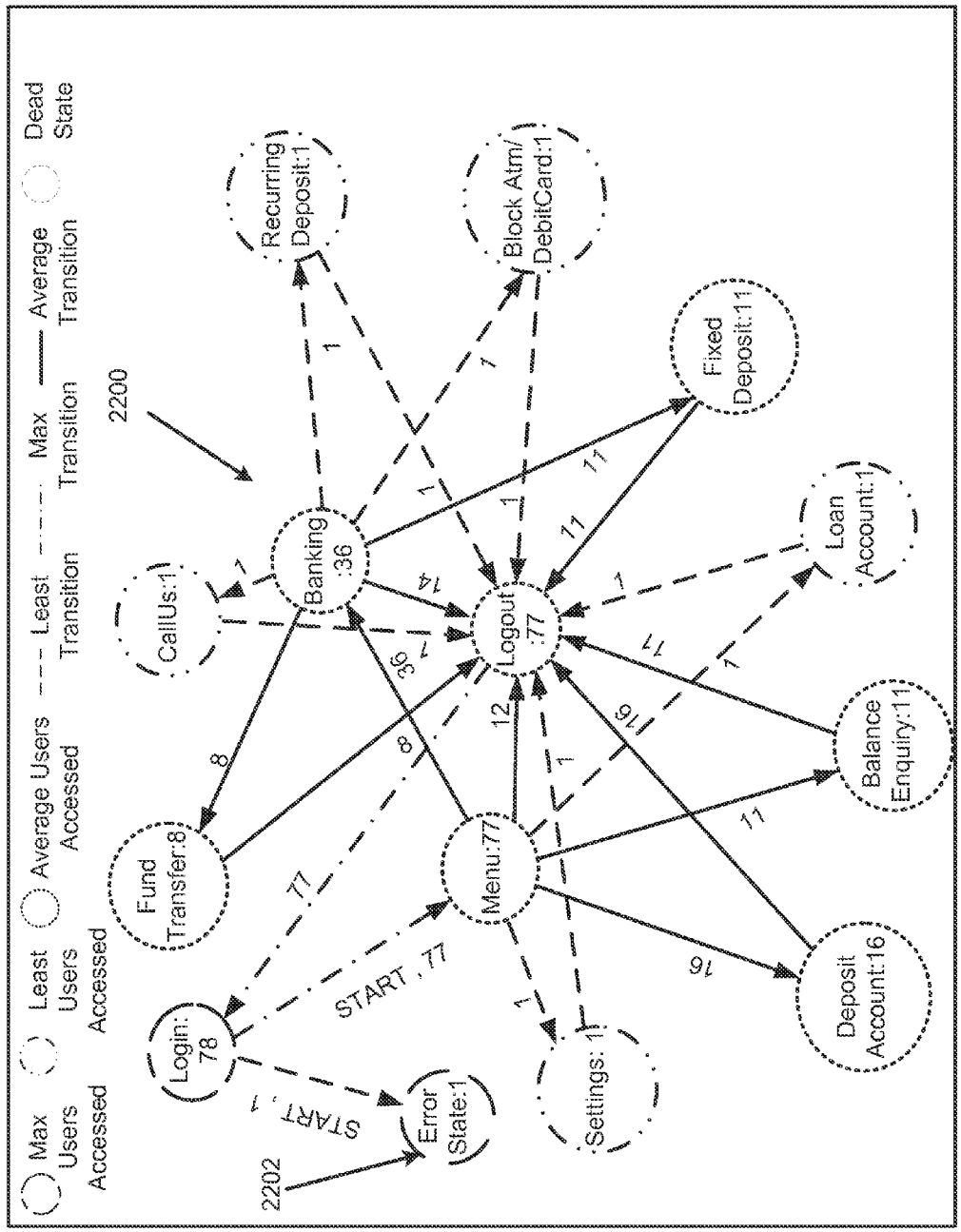
FIG. 22 illustrates a graph at an application level for the multi-data analysis based proactive defect detection and resolution system of FIG. 1, according to an example of the present disclosure.

FIG. 22 illustrates a graph at an application level for the system 100, according to an example of the present disclosure.

Referring to FIG. 22, the defect detector 112 may merge a plurality of user-level graphs (e.g., a plurality of graphs similar to the user-level graph 2100 for different users) to generate an application-level graph 2200. The defect detector 112 may utilize the application-level graph 2200 to determine the functionality associated with the application 106. For the example of FIGS. 13-21, the defect detector 112 may analyze the application-level graph 2200 to determine the login functionality includes the greatest number of nodes (e.g., 78 nodes). Further, the defect detector 112 may analyze the application-level graph 2200 to determine other functionalities associated with the application 106 (e.g., from login that includes 78 nodes, a user typically access menu that includes 77 nodes, etc.). The defect detector 112 may compare the application-level graph 2200 for a particular version of the application 106 to a previous application-level graph 2200 for a previous version of the application 106 to determine changes in functionalities associated with the application 106. For example, assuming that before a release of the particular version of the application 106 there was no error state (e.g., at 2202), based on the error state identified by the defect detector 112, the defect detector 112 may determine that there is a possible defect associated with the login functionality of the application 106. Assuming that the application-level graph 2200 for a particular version of the application 106 includes significant changes compared to previous versions of the application 106 (e.g., the application-level graph 2200 for the particular version of the application 106 includes several error states following the login functionality), the defect detector 112 may determine that a defect exists with respect to the login functionality of the application 106. In this regard, the defect detector 112 may also analyze a correlation of the determination of the existence of a defect with the sentiment and functional analysis performed by the data analyzer 102, and based on the correlation, conclude that a defect exists with respect to a particular functionality of the application 106.

With respect to FIGS. 17-22, the user interaction graphs and the aggregate application level graphs may be used by the defect detector 112 to trigger several insights. For example, as disclosed herein, the defect detector 112 may identify a potential defect in an application based on whether users are able to navigate to different parts of the application and any variance from previous navigation. The defect detector 112 may also identify popular or most frequently used functions or navigation flows over large set of users. These functions or navigation flows may then be investigated for improving user experience even further in subsequent application releases. User experience may be improved, for example, to provide the technical effects of generating better user interfaces for selected functionality, reducing a number of clicks required for navigating from a menu to a deeper functionality, etc. The defect detector 112 may also identify the wait time in a function within an application. For example, if users wait for an extended period of time on a function that displays a product catalog, and the architecture of application is such that the catalog is retrieved from a web service, the application and web-service may be investigated to reduce the latency. These aspects may be used by the defect detector 122 to provide the technical effect of reduced latency, for example, by pagination of the response sent by the web-service, improving the database read performance of the web-service, allocating more threads to the web service container so that the web service performance increases, horizontal scaling of the web service across multiple containers, etc.

Figures 23, 24:
FIG. 23 illustrates development data metrics for defect ticket generation for the multi-data analysis based proactive defect detection and resolution system of FIG. 1, according to an example of the present disclosure.
FIG. 24 illustrates an XML file for development data for the multi-data analysis based proactive defect detection and resolution system of FIG. 1, according to an example of the present disclosure.

FIG. 23 illustrates development data metrics for defect ticket generation for the system 100, according to an example of the present disclosure.

Referring to FIG. 23, as described herein with reference to FIG. 4, at 410, the defect ticket generator 116 may determine an entity (e.g., person, company, team, etc.) that worked on the particular application 106, and/or the particular defective functionality associated with the application 106. For example, referring to FIG. 23, the defect ticket generator 116 may analyze the application code development data 118 to determine the particular developers (e.g., "Dev123") that developed "version 2.1" for the application 106.

FIG. 24 illustrates an XML file for development data for the system 100, according to an example of the present disclosure.

Referring to FIG. 24, as described herein with reference to FIG. 4, at 412, the defect ticket generator 116 may generate the defect ticket 120 to a concerned team, with complete operation and technical context information related to the defect. The technical context information may include, for example, a development date of the application and/or functionality, the specific functionality that is defective, etc. As also described herein with reference to FIG. 4, at 414, the defect ticket generator 116 may generate the defect ticket 120 to the corporate and an IT team (e.g., at 2400) with respect to defect fixing timelines, to thus provide for collaboration with the IT team and intervention related to operation of the application 106. For example, the intervention may include an identification of alternate functionality for the application 106 that may be used during resolution of a particular defect.

The elements of the system 100 described herein may be machine readable instructions stored on a non-transitory computer readable medium. In addition, or alternatively, the elements of the system 100 may be hardware or a combination of machine readable instructions and hardware.

Figure 25:
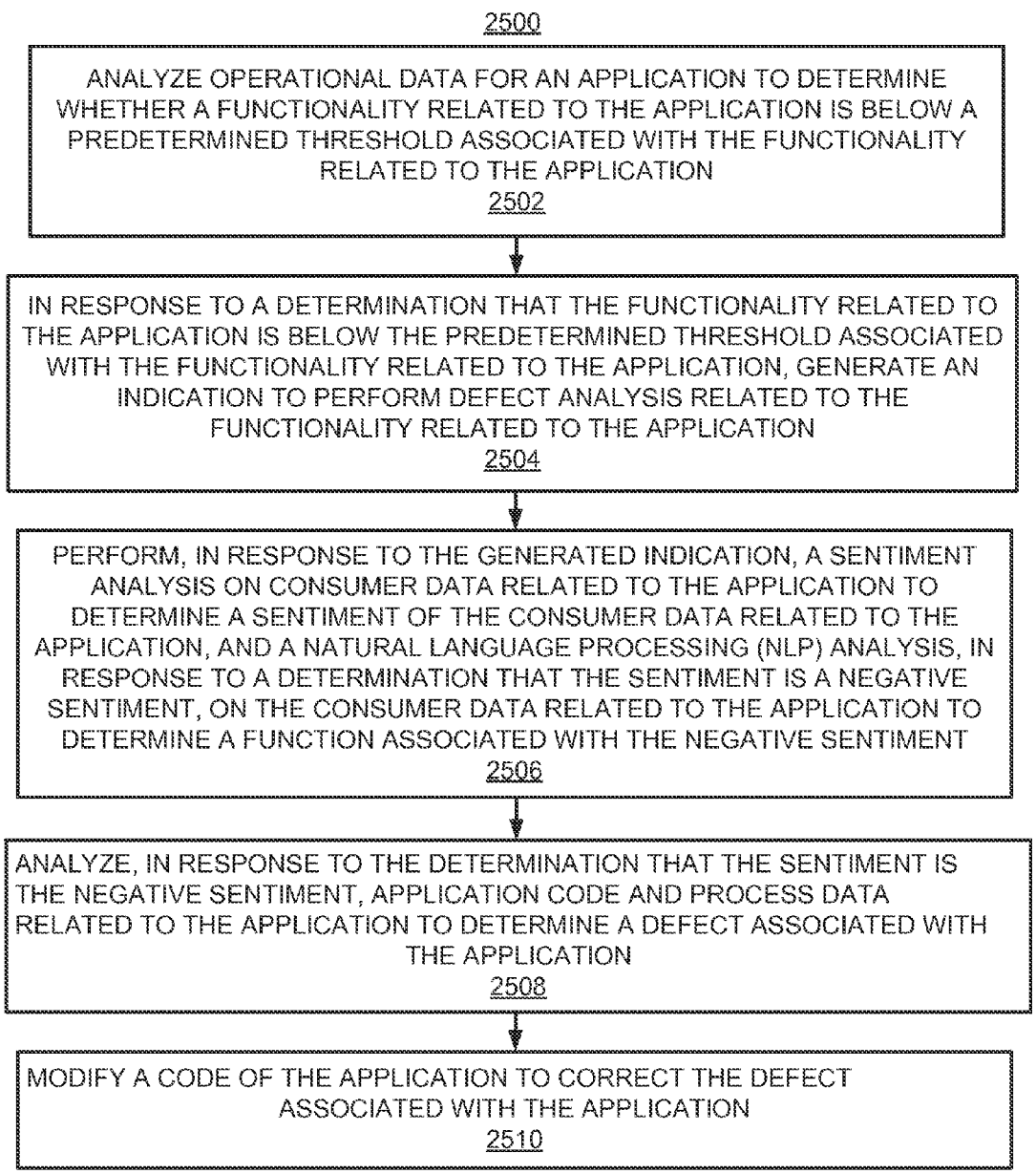
FIG. 25 illustrates a method for multi-data analysis based proactive defect detection and resolution, according to an example of the present disclosure.

FIGS. 25 and 26 illustrate flowcharts of methods 2500 and 2600 for multi-data analysis based proactive defect detection and resolution, according to examples. The methods 2500 and 2600 may be implemented on the multi-data analysis based proactive defect detection and resolution system 100 described above with reference to FIGS. 1-24 by way of example and not limitation. The methods 2500 and 2600 may be practiced in other systems.

Referring to FIGS. 1 and 25, at block 2502, the method 2500 may include analyzing, by the data analyzer 102 that is executed by at least one hardware processor, operational data 104 for an application 106 to determine whether a functionality related to the application 106 is below a predetermined threshold associated with the functionality related to the application 106.

At block 2504, in response to a determination that the functionality related to the application 106 is below the predetermined threshold associated with the functionality related to the application 106, the method 2500 may include generating (e.g., by the data analyzer 102) an indication to perform defect analysis related to the functionality related to the application 106.

At block 2506, the method 2500 may include performing (e.g., by the data analyzer 102), in response to the generated indication, a sentiment analysis on consumer data 110 related to the application 106 to determine a sentiment of the consumer data 110 related to the application 106, and a NLP analysis, in response to a determination that the sentiment is a negative sentiment, on the consumer data 110 related to the application 106 to determine a function associated with the negative sentiment.

At block 2508, the method 2500 may include analyzing, by the defect detector 112 that is executed by the at least one hardware processor, in response to the determination that the sentiment is the negative sentiment, application code and process data related to the application 106 to determine a defect associated with the application 106 by comparing a new user interaction pattern with the application 106 to a previous user interaction pattern with the application 106, and in response to a determination that the new user interaction pattern with the application 106 is different from the previous user interaction pattern with the application 106, identifying the defect associated with the application 106.

At block 2510, the method 2500 may include modifying, by the defect resolver 122 that is executed by the at least one hardware processor, a code of the application 106 to correct the defect associated with the application 106.

According to examples, the method 2500 may include determining, by a defect ticket generator 116 that is executed by the at least one hardware processor, a context of the defect associated with the application 106, and an entity associated with development of the function associated with the negative sentiment, and generating, by the defect ticket generator 116, a defect ticket 120 that includes an indication of the context of the defect associated with the application 106, and the entity associated with development of the function associated with the negative sentiment.

According to examples, the method 2500 may include analyzing (e.g., by the data analyzer 102) operational data 104 for the application 106 to determine whether the functionality related to the application 106 is below the predetermined threshold associated with the functionality related to the application 106 for a predetermined time period.

According to examples, the method 2500 may include analyzing operational data 104 for the application 106 to determine whether the functionality related to the application 106 is below the predetermined threshold associated with the functionality related to the application 106 by correlating the determination that the functionality related to the application 106 is below the predetermined threshold associated with the functionality related to the application 106 to a release history of the application 106, and determining, based on the correlation, whether the determination that the functionality related to the application 106 is below the predetermined threshold associated with the functionality related to the application 106 is based on a new release version of the application 106 or a previous release version of the application 106.

According to examples, for the method 2500, the consumer data 110 related to the application 106 may include application 106 store feedback data that includes feedback from users of the application 106.

According to examples, the method 2500 may include performing (e.g., by the data analyzer 102), in response to the generated indication, the NLP analysis, in response to the determination that the sentiment is the negative sentiment, on the consumer data 110 related to the application 106 to determine the function associated with the negative sentiment by comparing a text of the consumer data 110 related to the application 106 to a catalog of known functions related to the application 106, and based on a match of the text of the consumer data 110 related to the application 106 to a catalog function from the catalog of known functions related to the application 106, identifying the catalog function as the function associated with the negative sentiment.

According to examples, the method 2500 may include performing (e.g., by the data analyzer 102), in response to the generated indication, the NLP analysis, in response to the determination that the sentiment is the negative sentiment, on the consumer data 110 related to the application 106 to determine the function associated with the negative sentiment by comparing a text of the consumer data 110 related to the application 106 to a catalog of known functions related to the application 106, and based on a match of the text of the consumer data 110 related to the application 106 to a plurality of catalog functions from the catalog of known functions related to the application 106, identifying a catalog function from the plurality of catalog functions that includes a highest number of matches as the function associated with the negative sentiment.

According to examples, the method 2500 may include analyzing (e.g., by the defect detector 112), in response to the determination that the sentiment is the negative sentiment, application code and process data related to the application 106 to determine the defect associated with the application 106 by comparing the new user interaction pattern with the application 106 to the previous user interaction pattern with the application 106 by generating a plurality of user-level graphs related to interactions of a plurality of users with the application 106, merging the plurality of user-level graphs into an application-level graph for the application 106, comparing the application-level graph for the application 106 to a previous application-level graph for the application 106 to determine a change between the application-level graphs for the application 106, and determining the defect associated with the application 106 based on the determined change between the application-level graphs for the application 106.

According to examples, the method 2500 may include modifying (e.g., by the defect resolver 122) the code of the application 106 to correct the defect associated with the application 106 by implementing an alternate functionality related to the application 106.

According to examples, the method 2500 may include modifying (e.g., by the defect resolver 122) the code of the application 106 to correct the defect associated with the application 106 by modifying code associated with the functionality related to the application 106.

According to examples, the method 2500 may include determining (e.g., by the defect resolver 122) a criticality level of the defect based on an analysis of a number of users who have downloaded a new version of the application 106 versus an overall number of users who have downloaded the application 106, in response to a determination that the criticality level of the defect is less than a predetermined criticality level threshold, assign a first time period for modifying the code of the application 106 to correct the defect associated with the application 106, and in response to a determination that the criticality level of the defect is greater than the predetermined criticality level threshold, assign a second time period for modifying the code of the application 106 to correct the defect associated with the application 106, where the first time period is greater than the second time period.

According to examples, the method 2500 may include determining (e.g., by the defect resolver 122) a criticality level of the defect based on an analysis of a number of users who have updated to a new version of the application 106 versus an overall number of users who have downloaded the application 106, in response to a determination that the criticality level of the defect is less than a predetermined criticality level threshold, assigning a first time period for modifying the code of the application 106 to correct the defect associated with the application 106, and in response to a determination that the criticality level of the defect is greater than the predetermined criticality level threshold, assigning a second time period for modifying the code of the application 106 to correct the defect associated with the application 106, where the first time period is greater than the second time period.

According to examples, for the method 2500, the application 106 may include a mobile application 106 executed in an enterprise environment by a known group of users.

According to examples, for the method 2500, the application 106 may include a mobile application 106 executed in a digital environment by an unknown group of users.

According to examples, the method 2500 may include analyzing (e.g., by the data analyzer 102) operational data 104 for the application 106 to determine whether the functionality related to the application 106 is below the predetermined threshold associated with the functionality related to the application 106 by determining a danger score that represents a level of potential issues associated with a particular release version of the application 106.

According to examples, for the method 2500, the danger score of less than a predetermined first danger score threshold may represent no potential issues with the particular release version of the application 106, the danger score of greater than the predetermined first danger score threshold and less than a predetermined second danger score threshold may represent possible potential issues with the particular release version of the application 106, and the danger score of greater than the predetermined second danger score threshold may represent definite issues with the particular release version of the application 106.

Referring to FIGS. 1 and 26, at block 2602, the method 2600 may include performing, by a data analyzer 102 that is executed by at least one hardware processor, a sentiment analysis on consumer data 110 related to an application 106 to determine a sentiment of the consumer data 110 related to the application 106, and a language processing analysis, in response to a determination that the sentiment is a negative sentiment, on the consumer data 110 related to the application 106 to determine a function associated with the negative sentiment.

At block 2604, the method 2600 may include analyzing, by a defect detector 112 that is executed by the at least one hardware processor, in response to the determination that the sentiment is the negative sentiment, application code and process data related to the application 106 to determine a defect associated with the application 106 by comparing a new user interaction pattern with the application 106 to a previous user interaction pattern with the application 106, and in response to a determination that the new user interaction pattern with the application 106 is different from the previous user interaction pattern with the application 106, identifying the defect associated with the application 106 based on the difference of new user interaction pattern with the application 106 from the previous user interaction pattern with the application 106.

At block 2606, the method 2600 may include modifying, by a defect resolver 122 that is executed by the at least one hardware processor, a code of the application 106 to correct the defect associated with the application 106.

According to examples, the method 2600 may include determining, by a defect ticket generator 116 that is executed by the at least one hardware processor, a context of the defect associated with the application 106, and an entity associated with development of the function associated with the negative sentiment. Further, the method 2600 may include generating, by the defect ticket generator 116, a defect ticket 120 that includes an indication of the context of the defect associated with the application 106, and the entity associated with development of the function associated with the negative sentiment.

According to examples, a method for multi-data analysis based proactive defect detection and resolution may include performing, by a data analyzer 102 that is executed by at least one hardware processor, a sentiment analysis on consumer data 110 related to an application 106 to determine a sentiment of the consumer data 110 related to the application 106, and a language processing analysis on the consumer data 110 related to the application 106 to determine a function associated with the sentiment. The method for multi-data analysis based proactive defect detection and resolution may further include analyzing, by a defect detector 112 that is executed by the at least one hardware processor, application code and process data related to the application 106 to determine a defect associated with the application 106 by comparing a new user interaction pattern with the application 106 to a previous user interaction pattern with the application 106 to identify the defect associated with the application 106. The method for multi-data analysis based proactive defect detection and resolution may further include determining, by a defect ticket generator 116 that is executed by the at least one hardware processor, a context of the defect associated with the application 106, and generating, by the defect ticket generator 116, a defect ticket 120 that includes an indication of the context of the defect associated with the application 106.

Figure 27:
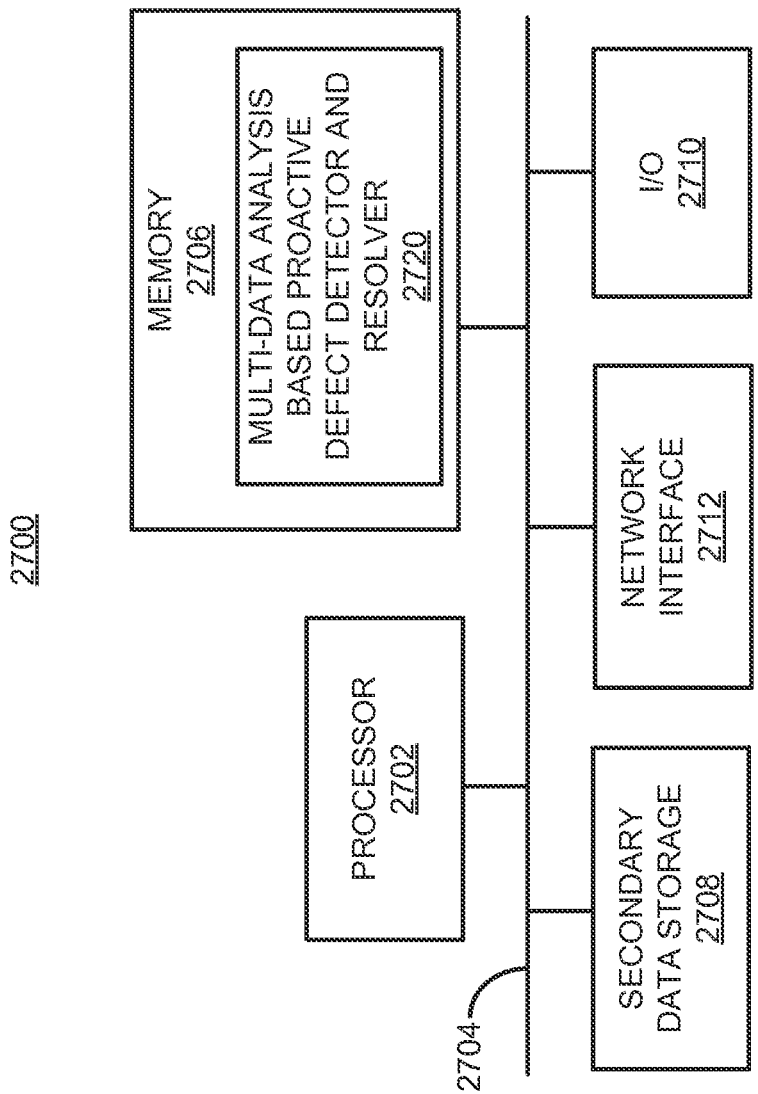
FIG. 27 illustrates a computer system, according to an example of the present disclosure.

FIG. 27 shows a computer system 2700 that may be used with the examples described herein. The computer system may represent a generic platform that includes components that may be in a server or another computer system. The computer system 2700 may be used as a platform for the system 100. The computer system 2700 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 2700 may include a processor 2702 that may implement or execute machine readable instructions performing some or all of the methods, functions and other processes described herein. Commands and data from the processor 2702 may be communicated over a communication bus 2704. The computer system may also include a main memory 2706, such as a random access memory (RAM), where the machine readable instructions and data for the processor 2702 may reside during runtime, and a secondary data storage 2708, which may be non-volatile and stores machine readable instructions and data. The memory and data storage are examples of computer readable mediums. The memory 2706 may include a multi-data analysis based proactive defect detector and resolver 2720 including machine readable instructions residing in the memory 2706 during runtime and executed by the processor 2702. The multi-data analysis based proactive defect detector and resolver 2720 may include the elements of the system 100 shown in FIG. 1.

The computer system 2700 may include an I/O device 2710, such as a keyboard, a mouse, a display, etc. The computer system may include a network interface 2712 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A multi-data analysis based proactive defect detection and resolution system comprising:
    a data analyzer, executed by at least one hardware processor, to
        analyze operational data for an application to determine whether a functionality related to the application is below a predetermined threshold associated with the functionality related to the application,
        in response to a determination that the functionality related to the application is below the predetermined threshold associated with the functionality related to the application, generate an indication to perform defect analysis related to the functionality related to the application,
        perform, in response to the generated indication,
            a sentiment analysis on consumer data related to the application to determine a sentiment of the consumer data related to the application, and
            a natural language processing (NLP) analysis, in response to a determination that the sentiment is a negative sentiment, on the consumer data related to the application to determine a function associated with the negative sentiment;
    a defect detector, executed by the at least one hardware processor, to
        analyze, in response to the determination that the sentiment is the negative sentiment, application code and process data related to the application to determine a defect associated with the application by
            comparing a new user interaction pattern with the application to a previous user interaction pattern with the application, and
            in response to a determination that the new user interaction pattern with the application is different from the previous user interaction pattern with the application, identifying the defect associated with the application; and
    a defect resolver, executed by the at least one hardware processor, to
        modify a code of the application to correct the defect associated with the application.

2. The multi-data analysis based proactive defect detection and resolution system according to claim 1, further comprising:
    a defect ticket generator, executed by the at least one hardware processor, to
        determine a context of the defect associated with the application,
        determine an entity associated with development of the function associated with the negative sentiment, and
        generate a defect ticket that includes an indication of the context of the defect associated with the application, and the entity associated with development of the function associated with the negative sentiment.

3. The multi-data analysis based proactive defect detection and resolution system according to claim 1, wherein the data analyzer is to analyze operational data for the application to determine whether the functionality related to the application is below the predetermined threshold associated with the functionality related to the application by
    analyzing operational data for the application to determine whether the functionality related to the application is below the predetermined threshold associated with the functionality related to the application for a predetermined time period.

4. The multi-data analysis based proactive defect detection and resolution system according to claim 1, wherein the data analyzer is to analyze operational data for the application to determine whether the functionality related to the application is below the predetermined threshold associated with the functionality related to the application by
    correlating the determination that the functionality related to the application is below the predetermined threshold associated with the functionality related to the application to a release history of the application, and
    determining, based on the correlation, whether the determination that the functionality related to the application is below the predetermined threshold associated with the functionality related to the application is based on a new release version of the application or a previous release version of the application.

5. The multi-data analysis based proactive defect detection and resolution system according to claim 1, wherein the consumer data related to the application includes application store feedback data that includes feedback from users of the application.

6. The multi-data analysis based proactive defect detection and resolution system according to claim 1, wherein the data analyzer is to perform, in response to the generated indication, the NLP analysis, in response to the determination that the sentiment is the negative sentiment, on the consumer data related to the application to determine the function associated with the negative sentiment by
comparing a text of the consumer data related to the application to a catalog of known functions related to the application, and
based on a match of the text of the consumer data related to the application to a catalog function from the catalog of known functions related to the application, identifying the catalog function as the function associated with the negative sentiment.

7. The multi-data analysis based proactive defect detection and resolution system according to claim 1, wherein the data analyzer is to perform, in response to the generated indication, the NLP analysis, in response to the determination that the sentiment is the negative sentiment, on the consumer data related to the application to determine the function associated with the negative sentiment by
comparing a text of the consumer data related to the application to a catalog of known functions related to the application, and
based on a match of the text of the consumer data related to the application to a plurality of catalog functions from the catalog of known functions related to the application, identifying a catalog function from the plurality of catalog functions that includes a highest number of matches as the function associated with the negative sentiment.

8. The multi-data analysis based proactive defect detection and resolution system according to claim 1, wherein the defect detector is to analyze, in response to the determination that the sentiment is the negative sentiment, application code and process data related to the application to determine the defect associated with the application by comparing the new user interaction pattern with the application to the previous user interaction pattern with the application by
generating a plurality of user-level graphs related to interactions of a plurality of users with the application,
merging the plurality of user-level graphs into an application-level graph for the application,
comparing the application-level graph for the application to a previous application-level graph for the application to determine a change between the application-level graphs for the application, and
determining the defect associated with the application based on the determined change between the application-level graphs for the application.

9. The multi-data analysis based proactive defect detection and resolution system according to claim 1, wherein the defect resolver is to modify the code of the application to correct the defect associated with the application by
implementing an alternate functionality related to the application.

10. The multi-data analysis based proactive defect detection and resolution system according to claim 1, wherein the defect resolver is to modify the code of the application to correct the defect associated with the application by
modifying code associated with the functionality related to the application.

11. The multi-data analysis based proactive defect detection and resolution system according to claim 1, wherein the defect resolver is to
determine a criticality level of the defect based on an analysis of a number of users who have downloaded a new version of the application versus an overall number of users who have downloaded the application,
in response to a determination that the criticality level of the defect is less than a predetermined criticality level threshold, assign a first time period for modifying the code of the application to correct the defect associated with the application, and
in response to a determination that the criticality level of the defect is greater than the predetermined criticality level threshold, assign a second time period for modifying the code of the application to correct the defect associated with the application, wherein the first time period is greater than the second time period.

12. The multi-data analysis based proactive defect detection and resolution system according to claim 1, wherein the defect resolver is to
determine a criticality level of the defect based on an analysis of a number of users who have updated to a new version of the application versus an overall number of users who have downloaded the application,
in response to a determination that the criticality level of the defect is less than a predetermined criticality level threshold, assign a first time period for modifying the code of the application to correct the defect associated with the application, and
in response to a determination that the criticality level of the defect is greater than the predetermined criticality level threshold, assign a second time period for modifying the code of the application to correct the defect associated with the application, wherein the first time period is greater than the second time period.

13. The multi-data analysis based proactive defect detection and resolution system according to claim 1, wherein the application is a mobile application.

14. The multi-data analysis based proactive defect detection and resolution system according to claim 1, wherein the application is a mobile application executed in an enterprise environment by a known group of users.

15. The multi-data analysis based proactive defect detection and resolution system according to claim 1, wherein the application is a mobile application executed in a digital environment by an unknown group of users.

16. The multi-data analysis based proactive defect detection and resolution system according to claim 1, wherein the data analyzer is to analyze operational data for the application to determine whether the functionality related to the application is below the predetermined threshold associated with the functionality related to the application by determining
a danger score that represents a level of potential issues associated with a particular release version of the application.

17. The multi-data analysis based proactive defect detection and resolution system according to claim 16, wherein
the danger score of less than a predetermined first danger score threshold represents no potential issues with the particular release version of the application, the danger score of greater than the predetermined first danger score threshold and less than a predetermined second danger score threshold represents possible potential issues with the particular release version of the application, and the danger score of greater than the predetermined second danger score threshold represents definite issues with the particular release version of the application.

18. A method for multi-data analysis based proactive defect detection and resolution, the method comprising:

analyzing, by a data analyzer that is executed by at least one hardware processor, operational data for an application to determine whether a functionality related to the application is below a predetermined threshold associated with the functionality related to the application;

generating, by the data analyzer that is executed by the at least one hardware processor, in response to a determination that the functionality related to the application is below the predetermined threshold associated with the functionality related to the application, an indication to perform defect analysis related to the functionality related to the application;

performing, by the data analyzer that is executed by the at least one hardware processor, in response to the generated indication,
a sentiment analysis on consumer data related to the application to determine a sentiment of the consumer data related to the application, and
a natural language processing (NLP) analysis, in response to a determination that the sentiment is a negative sentiment, on the consumer data related to the application to determine a function associated with the negative sentiment;

analyzing, by a defect detector that is executed by the at least one hardware processor, in response to the determination that the sentiment is the negative sentiment, application code and process data related to the application to determine a defect associated with the application by
comparing a new user interaction pattern with the application to a previous user interaction pattern with the application, and
in response to a determination that the new user interaction pattern with the application is different from the previous user interaction pattern with the application, identifying the defect associated with the application; and modifying, by a defect resolver that is executed by the at least one hardware processor,
a code of the application to correct the defect associated with the application.

19. The method for multi-data analysis based proactive defect detection and resolution according to claim 18, further comprising:

determining, by a defect ticket generator that is executed by the at least one hardware processor,
a context of the defect associated with the application, and
an entity associated with development of the function associated with the negative sentiment; and generating, by the defect ticket generator, a defect ticket that includes an indication of the context of the defect associated with the application, and the entity associated with development of the function associated with the negative sentiment.

20. A non-transitory computer readable medium having stored thereon machine readable instructions for multi-data analysis based proactive defect detection and resolution, the machine readable instructions when executed cause at least one hardware processor to:

analyze, by a data analyzer that is executed by the at least one hardware processor, operational data for an application to determine whether a functionality related to the application is below a predetermined threshold associated with the functionality related to the application;

generate, by the data analyzer that is executed by the at least one hardware processor, in response to a determination that the functionality related to the application is below the predetermined threshold associated with the functionality related to the application, an indication to perform defect analysis related to the functionality related to the application;

perform, by the data analyzer that is executed by the at least one hardware processor, in response to the generated indication,
a sentiment analysis on consumer data related to the application to determine a sentiment of the consumer data related to the application, and
a natural language processing (NLP) analysis, in response to a determination that the sentiment is a negative sentiment, on the consumer data related to the application to determine a function associated with the negative sentiment;

analyze, by a defect detector that is executed by the at least one hardware processor, in response to the determination that the sentiment is the negative sentiment, application code and process data related to the application to determine a defect associated with the application by
comparing a new user interaction pattern with the application to a previous user interaction pattern with the application, and
in response to a determination that the new user interaction pattern with the application is different from the previous user interaction pattern with the application, identifying the defect associated with the application; and modify, by a defect resolver that is executed by the at least one hardware processor, a code of the application to correct the defect associated with the application.

* * * * *